United States Patent
Itoh et al.

(10) Patent No.: US 11,351,918 B2
(45) Date of Patent: Jun. 7, 2022

(54) DRIVER-ASSISTANCE DEVICE, DRIVER-ASSISTANCE SYSTEM, METHOD OF ASSISTING DRIVER, AND COMPUTER READABLE RECORDING MEDIUM

(71) Applicant: TOYOTA JIDOSHA KABUSHIKI KAISHA, Toyota (JP)

(72) Inventors: Kazuhiro Itoh, Mishima (JP); Hitoshi Kumon, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 317 days.

(21) Appl. No.: 16/670,024

(22) Filed: Oct. 31, 2019

(65) Prior Publication Data

US 2020/0148112 A1 May 14, 2020

(30) Foreign Application Priority Data

Nov. 13, 2018 (JP) .............................. JP2018-213084

(51) Int. Cl.
| | |
|---|---|
| B60R 1/00 | (2022.01) |
| G08G 1/13 | (2006.01) |
| G06F 1/16 | (2006.01) |
| G08G 1/01 | (2006.01) |
| G06V 20/13 | (2022.01) |
| G06V 20/56 | (2022.01) |
| G06T 19/00 | (2011.01) |

(52) U.S. Cl.
CPC ................ *B60R 1/00* (2013.01); *G06F 1/163* (2013.01); *G06V 20/13* (2022.01); *G06V 20/56* (2022.01); *G08G 1/0141* (2013.01); *G08G 1/13* (2013.01); *G06T 19/006* (2013.01)

(58) Field of Classification Search
CPC ...... G06K 9/00791; G06K 9/46; H04L 67/12; B60R 1/00; B60R 2300/103; B60R 2300/205; B60R 2300/304; B60R 2300/50; B60R 2300/607; B60R 2300/8046; B60R 1/06; B60R 2300/105; G06F 1/163; G06F 3/013; G06V 20/13; G06V 20/56; G06V 20/59; G06V 40/18; G08G 1/0141; G08G 1/13; G08G 1/01; G08G 1/0962; G06T 19/006
See application file for complete search history.

(56) References Cited

U.S. PATENT DOCUMENTS 6,593,960 B1 7/2003 Sugimoto et al.
10,377,309 B2 * 8/2019 Lee ..................... G06V 20/584
(Continued)

FOREIGN PATENT DOCUMENTS

| JP | 2001-055100 A | 2/2001 |
|---|---|---|
| JP | 4329525 B2 | 9/2009 |

(Continued)

*Primary Examiner* — Md K Talukder
(74) *Attorney, Agent, or Firm* — Oliff PLC

(57) ABSTRACT

A driver-assistance device includes: a memory; and a processor including hardware. The processor is configured to: acquire both line-of-sight information on a line of sight of a driver and image data resulting from imaging surroundings of a vehicle; set a display position and display contents of an image generated from the image data based on the line-of-sight information; and output the display position and the display contents together with the image.

16 Claims, 16 Drawing Sheets

(56) References Cited

U.S. PATENT DOCUMENTS

| | | | | |
|---|---|---|---|---|
| 2014/0362195 | A1* | 12/2014 | Ng-Thow-Hing | G06V 40/20 348/51 |
| 2015/0317834 | A1* | 11/2015 | Poulos | G02B 27/017 345/619 |
| 2016/0350974 | A1* | 12/2016 | Hashimoto | G06F 3/14 |
| 2017/0032195 | A1* | 2/2017 | Gondo | G06V 20/56 |
| 2018/0120572 | A1* | 5/2018 | Watanabe | G06V 20/56 |
| 2018/0157036 | A1* | 6/2018 | Choi | G06T 19/006 |
| 2018/0253904 | A1* | 9/2018 | Kuwabara | G08G 1/167 |
| 2018/0257565 | A1* | 9/2018 | Nogimori | B60W 50/14 |
| 2019/0031102 | A1* | 1/2019 | Kishimoto | G08G 1/167 |
| 2019/0188891 | A1* | 6/2019 | Kamini | G06T 11/60 |
| 2019/0286123 | A1* | 9/2019 | Bando | G05D 1/0038 |
| 2020/0148112 | A1* | 5/2020 | Itoh | G06V 40/18 |
| 2021/0053440 | A1* | 2/2021 | Okuma | G06F 3/017 |

FOREIGN PATENT DOCUMENTS

| | | |
|---|---|---|
| JP | 2011-213186 A | 10/2011 |
| JP | 2013-162328 A | 8/2013 |
| JP | 2014-116756 A | 6/2014 |
| JP | 2016-041562 A | 3/2016 |
| JP | 2017-129406 A | 7/2017 |
| JP | 2018-022958 A | 2/2018 |
| JP | 2018-052281 A | 4/2018 |
| JP | 2018-163310 A | 10/2018 |
| WO | 2015/104860 A1 | 7/2015 |
| WO | 2017/130439 A1 | 8/2017 |

* cited by examiner

DRIVER-ASSISTANCE DEVICE, DRIVER-ASSISTANCE SYSTEM, METHOD OF ASSISTING DRIVER, AND COMPUTER READABLE RECORDING MEDIUM

The present application claims priority to and incorporates by reference the entire contents of Japanese Patent Application No. 2018-213084 filed in Japan on Nov. 13, 2018.

BACKGROUND

The present disclosure relates to a driver-assistance device, a driver-assistance system, and a method of assisting a driver and a computer readable recording medium.

A technique of providing an electronic mirror instead of an inner mirror, an outer mirror, or the like of a vehicle is known (see, for example, JP 2018-22958 A). The electronic mirror displays a virtual mirror image generated from an image captured by an imaging device mounted on the vehicle on a display such as liquid crystal display.

With the development of high-speed, high-capacity communication, vehicles capable of acquiring a large amount of information through vehicle-to-vehicle communication, road-to-vehicle communication, or the like have been increasingly manufactured. Under such a circumstance, it is expected to allow a driver to intuitively grasp various information on a surrounding environment of a vehicle based on information acquired by the vehicle through communication.

SUMMARY

According to one aspect of the present disclosure, there is provided a driver-assistance device including: a memory; and a processor comprising hardware, the processor being configured to acquire both line-of-sight information on a line of sight of a driver and image data resulting from imaging surroundings of a vehicle, set a display position and display contents of an image generated from the image data based on the line-of-sight information, and output the display position and the display contents together with the image.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Figure 1:
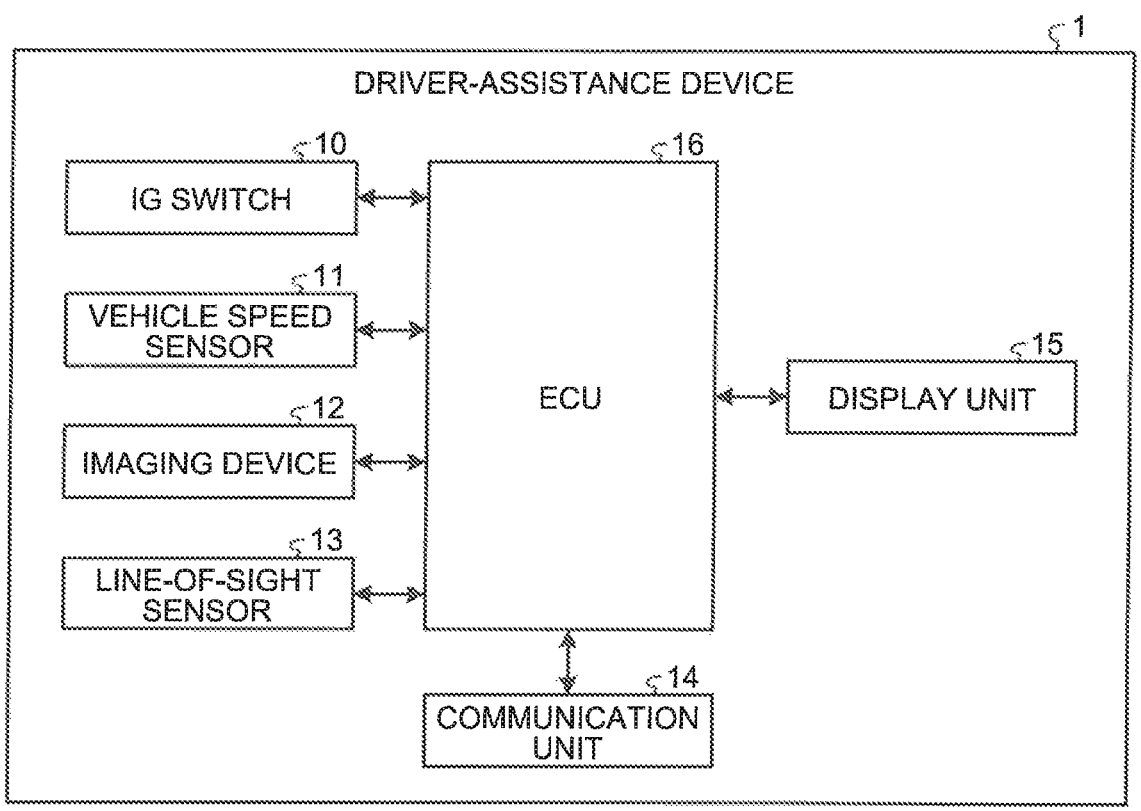
FIG. 1 is a block diagram illustrating a functional configuration of a driver-assistance device mounted on vehicle according to a first embodiment.

Hereinafter, a description will be given in detail of embodiments with reference to the drawings. Note that the present disclosure is not limited to the following embodiments. Further, in the following description, the same parts will be denoted by the same reference numerals.

FIG. 1 is a block diagram illustrating a functional configuration of a driver-assistance device mounted on a vehicle according to a first embodiment. A driver-assistance device 1 illustrated in FIG. 1 is mounted on the vehicle and cooperates with other electronic control units (ECUs) mounted on the vehicle to assist a driver in the vehicle to drive the vehicle. The driver-assistance device 1 illustrated in FIG. 1 includes an ignition switch 10 (hereinafter, referred to as an "IG switch 10"), a vehicle speed sensor 11, an imaging device 12, a line-of-sight sensor 13, a communication unit 14, a display unit 15, an electronic control unit (ECU) 16, and the like.

The IG switch 10 receives activation and deactivation of an electrical system such as an engine or a motor. The IG switch 10 activates an IG power supply upon being turned to ON and deactivates the IG power supply upon being turned to OFF.

The vehicle speed sensor 11 detects a vehicle speed while the vehicle is traveling and outputs the detection result to the ECU 16.

The imaging devices 12 are provided at a plurality of locations on an outer side of the vehicle, for example, at least four locations including a front, a rear, and both sides, to have an imaging angle of view of 360°. Each the imaging devices 12 images surroundings of the vehicle to generate image data and outputs the image data to the ECU 16 under control of the ECU 16. The imaging device 12 includes an optical system including one or a plurality of lenses, a charge coupled device (CCD), a complementary metal oxide semiconductor (CMOS) that receives light representing an object image that results from collecting light with the optical system to generate the image data, and the like.

The line-of-sight sensor 13 detects a line of sight of the driver and outputs the detection result to the ECU 16. The line-of-sight sensor 13 includes an optical system, a COD or CMOS, a memory, and a processor including hardware such as a central processing unit (CPU) or a graphics processing unit (GPU). The line-of-sight sensor 13 detects both a non-moving part of eyes of the driver as a reference point (for example, an inner corner) using, for example, known template matching and a moving part of the eyes (for example, an iris) as a moving point to detect the line of sight of the driver based on a positional relation between the reference point and the moving point. Note that, according to the first embodiment, the line-of-sight sensor 13 detects the line of sight of the driver with a visible light camera, but the present disclosure is not limited to the first embodiment, and the line of sight of the driver may be detected by an infrared light camera. When the line-of-sight sensor 13 is constituted by an infrared light camera, the line-of-sight sensor 13 causes an infrared light emitting diode (LED) or the like to emit infrared light to the driver, detects a reference point (for example, corneal reflection) and a moving point (for example, a pupil) from image data that results from imaging the driver with the infrared light camera, and detects the line of sight of the driver based on a positional relation between the reference point and the moving point.

The communication unit 14 transmits and receives various information to and from a server (not illustrated) in accordance with a predetermined communication standard via a base station and a network under the control of the ECU 16. Further, the communication unit 14 transmits and receives various information to and from a wearable device (not illustrated), another vehicle, a user terminal device, or the like in accordance with a predetermined communication standard. The communication unit 14 includes a communication module capable of radio communication.

The display units 15 are provided at a plurality of locations in a cabin of the vehicle including, for example, a roof, a windshield, a side window, and the like, and display or project an image, a motion image, and character information onto the cabin of the vehicle to provide a display under the control of the ECU 16. Each of the display unit 15 includes, for example, ahead-up display (HUD), a display provided on the roof of the vehicle, or the like. Specifically, the display unit 15 includes an image display device having a display panel such as an organic electro luminescence (EL) panel or a liquid crystal panel onto which an image is projected, a diffusion plate where the image projected by the image display device is formed as an intermediate image, a magnifying glass that magnifies the intermediate image formed by the diffusion plate and projects the image thus magnified onto the roof, the windshield, the side windows, and the like.

The ECU 16 controls an operation of each unit of the driver-assistance device 1. The ECU 16 includes a memory, and a processor including hardware such as a CPU. The ECU 16 sets a display position and display contents of the image generated from the image data based on line-of-sight information on the line of sight of the driver acquired from the line-of-sight sensor 13 and outputs the display position and the display contents together with the image. Specifically, the ECU 16 controls and outputs, based on a direction of the line of sight of the driver detected by the line-of-sight sensor 13, the display position and the display contents of the image to be displayed by the display unit 15 and corresponding to the image data acquired from the imaging device 12. Note that, according to the first embodiment, the ECU 16 functions as a processor.

Figure 2:
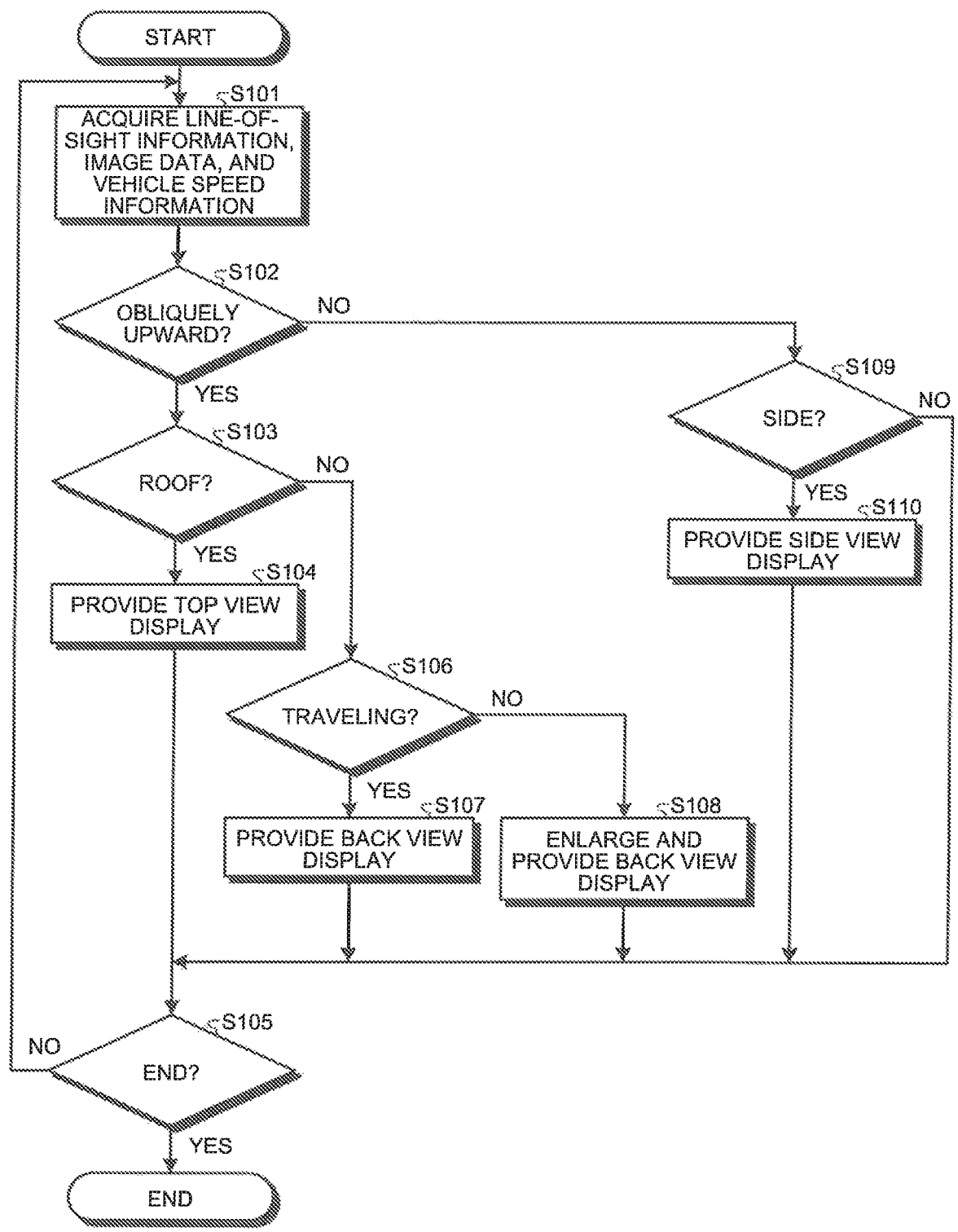
FIG. 2 is a flowchart illustrating an outline of processing to be executed by the driver-assistance device according to the first embodiment.

Next, a description will be given of processing to be executed by the driver-assistance device 1. FIG. 2 is a flowchart illustrating an outline of the processing to be executed by the driver-assistance device 1.

As illustrated in FIG. 2, the ECU 16 first acquires the line-of-sight information on the line of sight of the driver detected by the line-of-sight sensor 13, the image data generated by the imaging device 12, and vehicle speed information detected by the vehicle speed sensor 11 (Step S101).

Subsequently, when the ECU 16 determines that the line of sight of the driver is directed obliquely toward an upper side of a boundary between the windshield and the roof of the vehicle (Step S102: Yes) and determines that the line of sight of the driver is directed toward the roof (Step S103: Yes) based on the line-of-sight information acquired from the line-of-sight sensor 13, the driver-assistance device 1 proceeds to Step S104.

Figure 3:
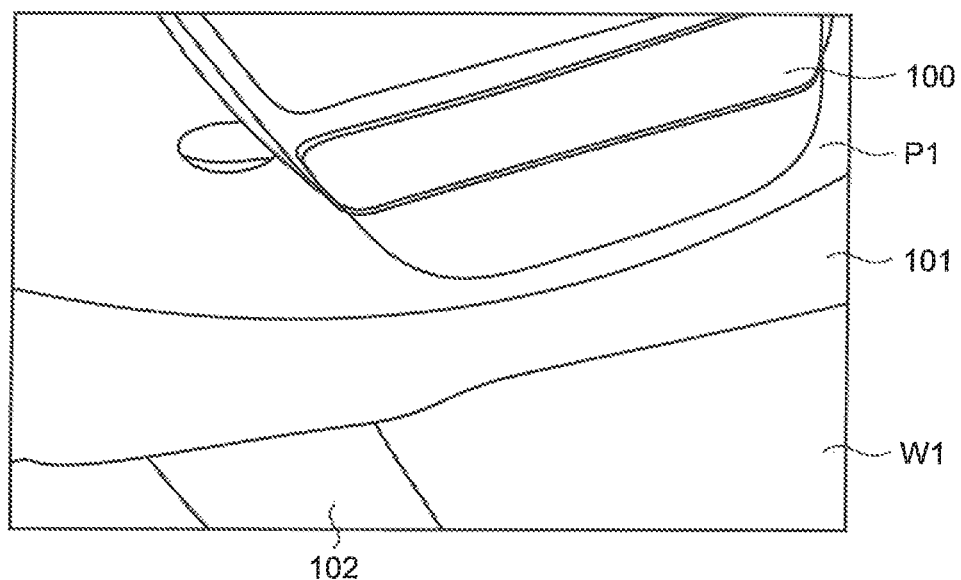
FIG. 3 is a diagram schematically illustrating an example of a top view display.

Subsequently, the ECU 16 generates a bird's-eye view image being a virtual bird's-eye view image representing a bird's-eye view of the vehicle and to be displayed on the roof of the vehicle based on the image data acquired from the imaging device 12 and outputs the bird's-eye view image to the display unit 15 to cause the display unit 15 to display the bird's-eye view image on the roof of the vehicle to provide a top view display (Step S104). Specifically, as illustrated in FIG. 3, the ECU 16 causes the display unit 15 to display a bird's-eye view image P1 to be displayed on a roof 101 of a vehicle 100. In this case, the ECU 16 rotates a real image corresponding to the image data resulting from imaging the vehicle 100 from above with the imaging device 12 by 180° about an axis passing through a center of the real image to be orthogonal to the real image, then, for example, laterally inverts the real image in a longitudinal direction of the vehicle 100 and resizes the real image to adjust a distance between the vehicle 100 and the driver to generate the virtual bird's-eye view image P1, and outputs the bird's-eye view image P1 to the display unit 15. Herein, the bird's-eye view image P1 contains an image of the vehicle 100 being a mirror image with respect to a plane of symmetry parallel to a reference plane determined in accordance with, for example, positions of wheels of the vehicle 100. Under the control of the ECU 16, the display unit 15 displays the bird's-eye view image P1 input from the ECU 16 on the roof of the vehicle. As a result, since the bird's-eye view image P1 is displayed on the roof 101, the driver can intuitively grasp a situation of the surrounding environment of the vehicle 100. Furthermore, since the bird's-eye view image P1 is displayed on the roof 101, the driver can easily grasp a distance to an object located around the vehicle 100 and thus can easily avoid danger. Note that the ECU 16 may output, to the display unit 15, the bird's-eye view image P1 that has not been laterally inverted. After Step S104, the driver-assistance device 1 proceeds to Step S105.

Figure 4:
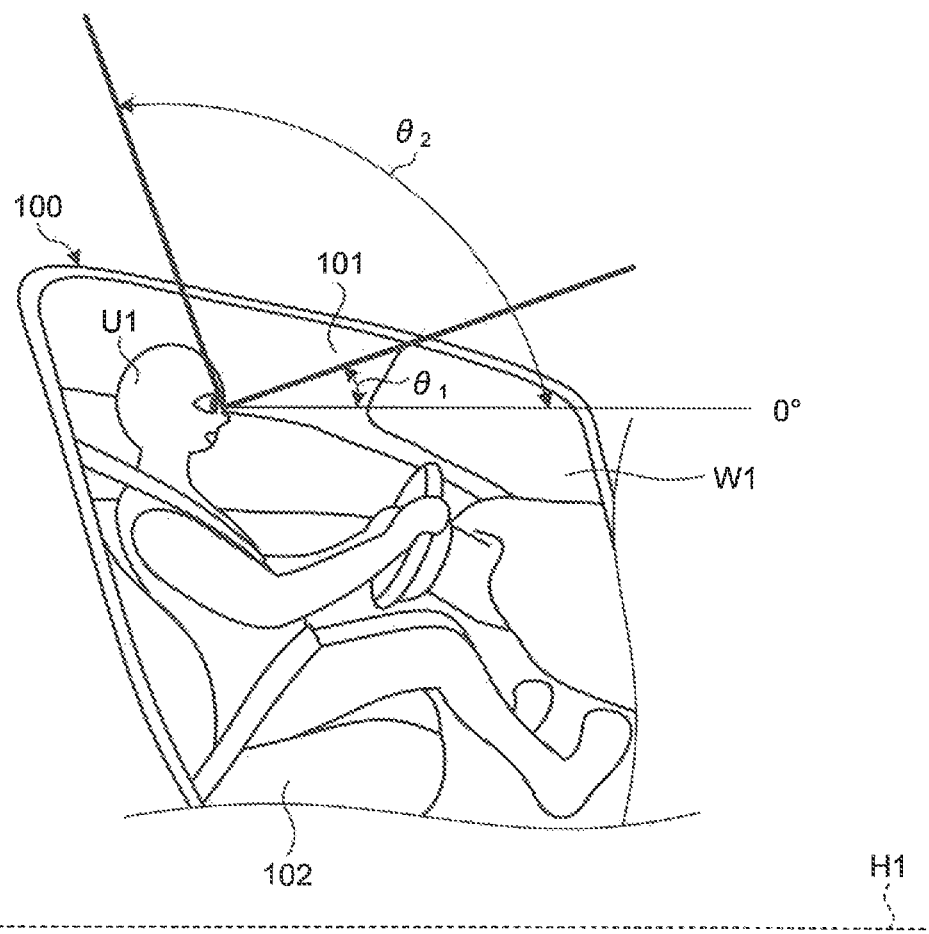
FIG. 4 is a schematic diagram for describing a display area of a bird's-eye view image.

In Step S104, the ECU 16 may control the display unit 15 to display the bird's-eye view image P1 within a predetermined display range. FIG. 4 is a schematic diagram for describing a display area of the bird's-eye view image P1. In FIG. 4, a reference plane H1 is determined in accordance with the positions of the wheels of the vehicle 100, and the like. Furthermore, a description will be given of FIG. 4 using an elevation angle based on a direction of a line of sight of a driver U1 set to 0° when the driver U1 looks in a direction parallel to the reference plane while being seated on a driver's seat 102. Note that the description will be given on the assumption that the elevation angle is determined with an angle when the driver U1 faces upward relative to the direction of 0° in FIG. 4 (an angle counterclockwise from 0° in FIG. 4) as a positive direction.

As illustrated in FIG. 4, for display of the bird's-eye view image P1 on the roof 101, the ECU 16 need not display the bird's-eve view image P1 on the entire roof 101 and may control the display unit 15 to display the bird's-eye view image P1 on an area in accordance with the elevation angle within a predetermined angle range ($\theta_1$ to $\theta_2$). Herein, the angle $\theta_1$ is an angle when the direction of the line of sight of the driver U1 passes through the boundary between the roof 101 and the windshield W1 and is determined depending on the type of the vehicle. Further, the angle $\theta_2$ is an angle when the driver U1 inclines his or her head most upward and directs his or her line of sight most upward. In general, it is assumed that the human head can be inclined upward about 50°, and the line of sight can be directed upward about 60° relative to a forward direction. Therefore, the angle $\theta_2$ is about 110° based on this assumption.

Figure 5:
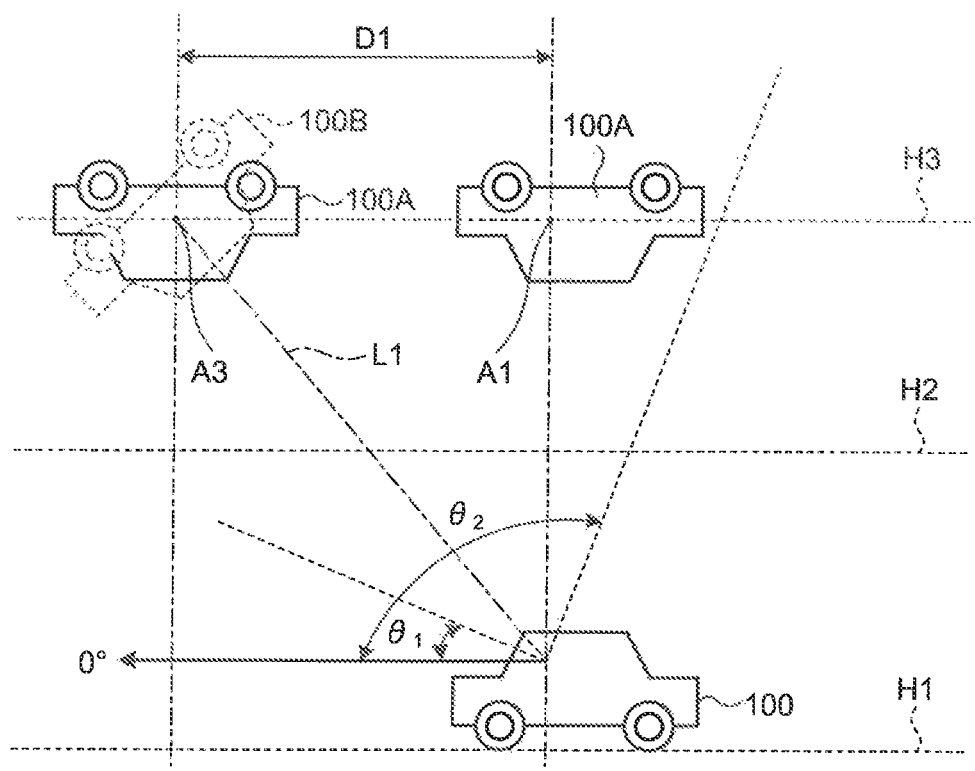
FIG. 5 is a schematic diagram for describing an offset of the bird's-eye view image.

Further, in Step S104, the ECU 16 may control the display unit 15 to offset the bird's-eye view image P1 to a position where a plane parallel to the reference plane H1 and passing through a predetermined reference position in the vehicle 100 intersects with the direction of the line of sight of the driver U1 and display the bird's-eye view image P1. FIG. 5 is a schematic diagram for describing an offset of the bird's-eye view image P1.

As illustrated in FIG. 5, the ECU 16 offsets an image 100A (bird's-eye view image P1) being a mirror image of the vehicle 100 relative to a symmetry plane H2 parallel to the reference plane H1 forward and causes the display unit 15 to display the image 100A. An offset amount D1 is determined on condition that the bird's-eye view image P1 after being offset lies within the angle range $\theta_1$ to $\theta_2$ of the elevation angle described above. That is, the ECU 16 offsets the bird's-eye image representing the image 100A to a position A3 where a plane H3 passing through a predetermined reference position A1 in the image 100A intersects with a direction of a line of sight L1 and outputs the bird's-eye image to the display unit 15. In this case, the ECU 16 may enlarge the bird's-eye image P1 based on a size of a pupil of the driver U1 detected by the line-of-sight sensor 13 and cause the display unit 15 to display the bird's-eye image P1. Furthermore, as illustrated in FIG. 5, the ECU 16 may output, to the display unit 15, a bird's-eye image representing an image 100B that results from rotating the image 100A by 45° about the reference position A1 in the image 100A to orient a front of the image 100A upward relative to the plane H3, for example. This allows the driver U1 to reduce a burden on his or her neck and in turn allows the driver U1 to more easily grasp the environment around the vehicle 100.

Figure 6A:
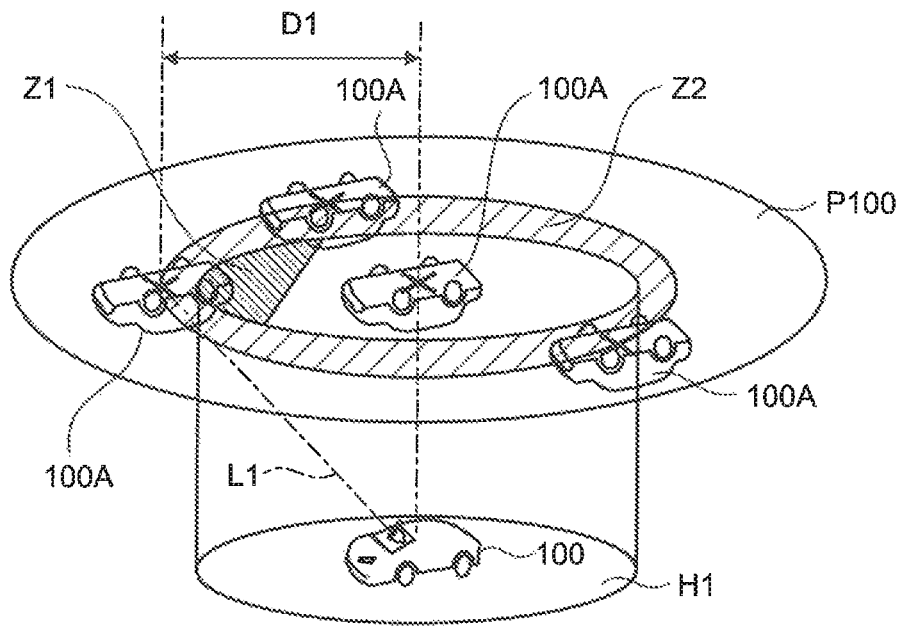
FIG. 6A is a schematic diagram for describing another example of the bird's-eye view image.
Figure 6B:
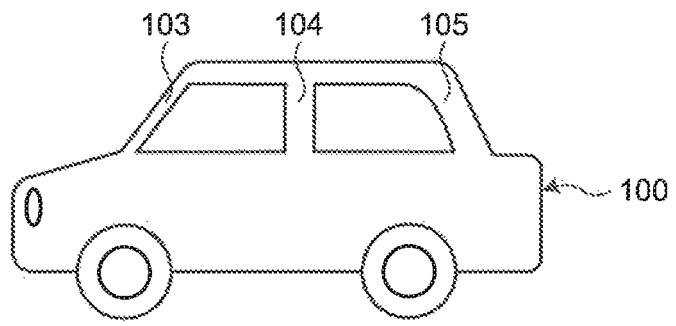
FIG. 6B is a diagram illustrating part names of a vehicle.
Figure 6C:
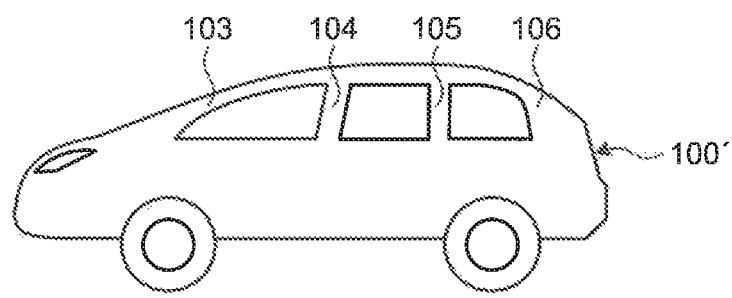
FIG. 6C is a diagram illustrating part names of a vehicle.

Further, as illustrated in FIG. 6A, the ECU 16 may cause the display unit 15 to display, on the roof 101 of the vehicle 100, an annular bird's-eye view image P100 that results from imaging the whole surroundings (360°) of the vehicle 100 with the imaging device 12. In this case, the ECU 16 may cause the display unit 15 to display the bird's-eye view image P100 with the offset amount described above. At this time, as illustrated in FIG. 6A, FIG. 6B, or FIG. 6C, the ECU 16 performs trimming processing to cut out at least an area of the bird's-eye view image P100 where an interior part appear when viewed from the cabin of the vehicle 100 or 100' and then outputs the bird's-eye view image P100. Herein, the interior part that appears when viewed from the cabin of the vehicle includes a roof, a door, a front pillar (hereinafter, referred to as an "A pillar"), a center pillar (hereinafter, referred to a "B pillar"), a quarter pillar (hereinafter, referred to as a "C pillar"), a rear pillar (hereinafter, referred to as a "D pillar"), and the like of the vehicle 100 of FIG. 6B or the vehicle 100' of FIG. 6C. That is, as illustrated in FIGS. 6A to 6C, the ECU 16 performs the trimming processing to cut out at least areas Z1, Z2 of the bird's-eye view image P100 where the roof, the door, the A pillar, the B pillar, the C pillar, the D pillar, and the like of the vehicle 100 or the vehicle 100' appear, and causes the display unit 15 to virtually display the bird's-eye view image P100 subjected to the trimming processing on the roof of the vehicle 100 or the vehicle 100'. As described above, the ECU 16 performs the trimming processing to cut out the areas Z1, Z2 where the roof, the door, the A pillar, the B pillar or the C pillar, the D pillar, and the like of the vehicle 100 appear, making it possible to prevent an occurrence of an occlusion state where an image representing an area located farther than an obstacle such as the roof 101 is hidden by the obstacle. This in turn prevents the driver U1 from feeling discomfort in perspective of the bird's-eye view image P100.

Returning to FIG. 2, the description of Step S105 and subsequent steps will be continued.

In Step S105, the ECU 16 determines whether the IG switch 10 has been turned to OFF. When the ECU 16 determines that the IC switch 10 is OFF (Step S105: Yes), the driver-assistance device 1 brings the present processing to an end. In contrast, when the ECU 16 determines that the IG switch 10 is not OFF (Step S105: No), the driver-assistance device 1 returns to Step S101 described above.

In Step S102, when the ECU 16 determines that the line of sight of the driver is directed obliquely toward the upper side of the boundary between the windshield and the roof of the vehicle (Step S102: Yes) and determines that the line of sight of the driver is not directed toward the roof (Step S103: No), the driver-assistance device 1 proceeds to Step S106.

Subsequently, the ECU 16 determines whether the vehicle is traveling based on the vehicle speed information acquired from the vehicle speed sensor 11 (Step S106), and determines that the vehicle is traveling (Step 106: Yes), the driver-assistance device 1 proceeds to Step S107.

Figure 7:
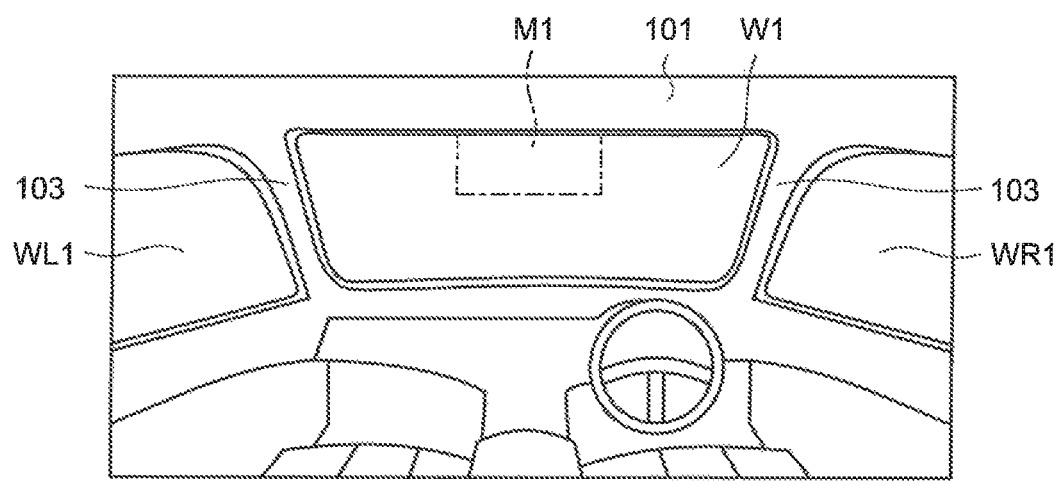
FIG. 7 is a schematic diagram for describing a display position of a back view display.
Figure 8:
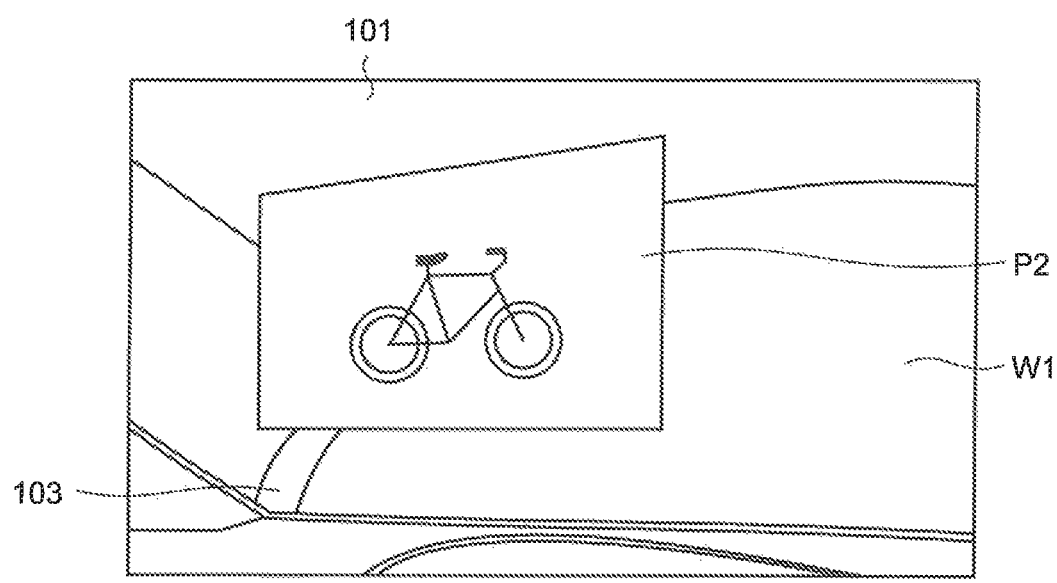
FIG. 8 is a schematic diagram illustrating an example of a rear image on the back view display.

Subsequently, the ECU 16 generates a rear image that results from imaging a rear of the vehicle based on the image data acquired from the imaging device 12 and outputs the rear image to the display unit 15 to cause the display unit 15 to project the rear image onto a position corresponding to an upper center of the windshield to provide a back view display (Step S107). Specifically, as illustrated in FIG. 7 and FIG. 8, the ECU 16 causes the display unit 15 to project a rear image P2 corresponding the image data that results from imaging the rear of the vehicle 100 with the imaging device 12 onto a position M1 corresponding to the upper center of the windshield W1, for example, a position corresponding to an area where a conventional rearview mirror or an electronic mirror is installed, to provide the back view display. In this case, the ECU 16 outputs, to the display unit 15, the rear image P2 that results from, for example, laterally inverting the image corresponding to the image data that results from imaging the rear of the vehicle 100 with the imaging device 12 and resizing the image to adjust the distance in a known manner. This allows the driver U1 to intuitively grasp the rear image P2 without feeling discomfort. Furthermore, this makes it possible to remove the rearview mirror from the vehicle 100 or downsize the rearview mirror and in turn makes it possible to make a visual field of the driver during driving wider and increase safety. After Step S107, the driver-assistance device 1 proceeds to Step S105.

In Step S106, when the ECU 16 determines that the vehicle is not traveling (Step S106: No), the driver-assistance device 1 proceeds to Step S108.

Figure 9:
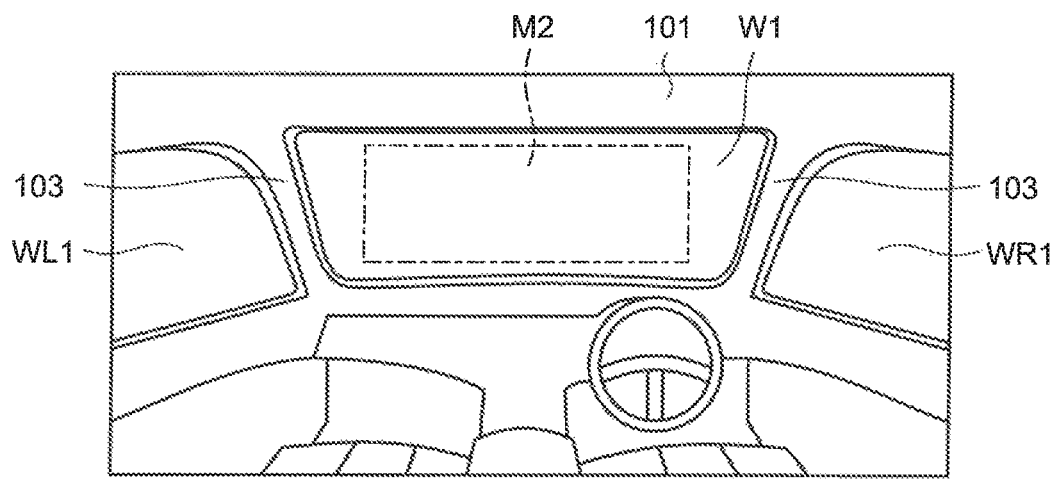
FIG. 9 is a schematic diagram for describing a display position on of an enlarged back view display.

Subsequently, the ECU 16 outputs, to the display unit 15, an enlarged image resulting from enlarging the rear image P2 that results from imaging the rear of the vehicle to a size corresponding to an area of the windshield based on the image data acquired from the imaging device 12 to cause the display unit 15 to project the enlarged image to provide an enlarged back view display (Step S108). Specifically, as illustrated in FIG. 9, the ECU 16 outputs, to the display unit 15, an enlarged image resulting from enlarging the rear image P2 that results from imaging the rear of the vehicle 100 to fit into a position M2 corresponding to the area of the windshield W1. In this case, under the control of the ECU 16, the display unit 15 projects the enlarged image onto the position corresponding to the area of the windshield W1 to provide the enlarged back view display. This allows the driver U1 to easily grasp a blind spot at the rear of the vehicle as compared with when the vehicle is traveling. In this case, the ECU 16 may cause the imaging device 12 to image the rear of the vehicle with the angle of view of the imaging device 12 changed wider than an angle of view when the vehicle is traveling. Furthermore, the ECU 16 may cause the display unit 15 to display the enlarged image on which a side image that results from imaging a rear of a side of the vehicle with the imaging device 12 has been superimposed. After Step S108, the driver-assistance device 1 proceeds to Step S105.

In Step S102, when the ECU 16 determines that the line of sight of the driver is not directed obliquely toward the upper side of the vehicle (Step S102: No) and determines that the line of sight of the driver is directed to a side of the vehicle (Step S109: Yes), the driver-assistance device 1 proceeds to Step S110. Herein, the side of the vehicle means refers to any one of a side window of the vehicle, a position corresponding to a conventional sideview mirror, and a side of the A pillar of the vehicle adjacent to a side window.

Figure 10:
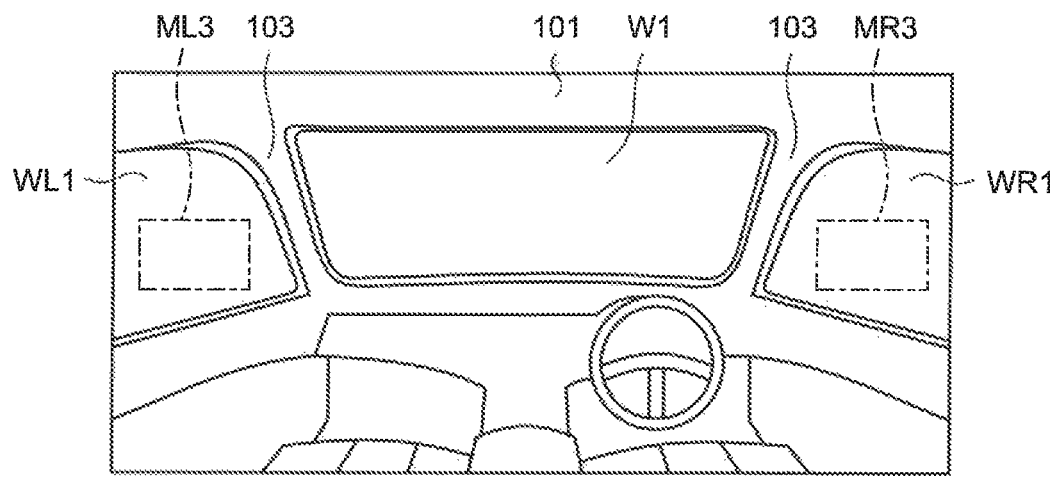
FIG. 10 is a schematic diagram for describing display positions of a side view display.
Figure 11A:
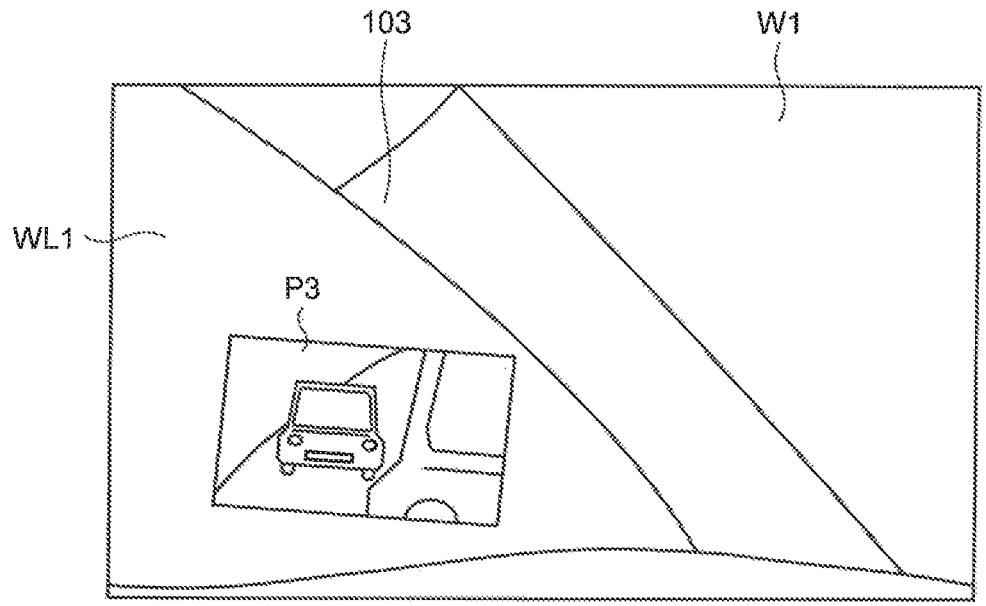
FIG. 11A is a schematic diagram for describing an example of a side image on the side view display.

Subsequently, the ECU 16 generates the side image that results from imaging a rear of the side of the vehicle based on the image data acquired from the imaging device 12 and outputs the side image to the display unit 15 to cause the display unit 15 to project the side image onto the position corresponding to an area where a conventional sideview mirror is installed to provide a side view display (Step S110). Specifically, as illustrated in FIG. 10 and FIG. 11A, when the line of sight of the driver is directed toward a side window WL1 remote from the driver's seat, the ECU 16 causes the display unit 15 to project, onto a position ML1 corresponding to an area where a conventional left sideview mirror is installed, a side image P3 corresponding to image data that results from imaging a rear left of the vehicle 100 with the imaging device 12 to provide the side view display. In this case, the ECU 16 outputs, to the display unit 15, the side image P3 that results from, for example, laterally inverting the image corresponding to the image data that results from imaging the rear left of the vehicle 100 with the imaging device 12 and resizing the image to adjust the distance in a known manner. Further, when the line of sight of the driver is directed toward a side window WR1 adjacent to the driver's seat, the ECU 16 causes the display unit 15 to project, onto a position MR1 corresponding to an area where a conventional right sideview mirror is installed, the side image P3 to provide the side view display. In this case, when the line of sight of the driver is directed toward the side window WL1 remote from the driver's seat, the ECU 16 may cause the display unit 15 to display the side image P3 at a display timing earlier than a display timing when the line of sight of the driver is directed toward the side window WR1 adjacent to the driver's seat. Thus, even when the driver moves his or her line of sight between the side windows, the ECU 16 causes the display unit 15 to display the side image P3 at a display timing earlier than a display timing when the line of sight of the driver is directed toward the side window WR1 adjacent to the driver's seat, allowing the driver to drive while looking at the rears of both the sides without feeling discomfort. After Step S110, the driver-assistance device 1 proceeds to Step S105.

In Step S110, when the line of sight of the driver is directed toward the side window WL1 remote from the driver's seat, the ECU 16 may output, to the display unit 15, a side image P3 enlarged larger than the side image P3 displayed when the line of sight of the driver is directed toward the side window WR1 adjacent to the driver's seat to cause the display unit 15 to project the side image P3 thus enlarged to provide the side view display. This allows the driver to check, even when the driver instantly moves his or her line of sight between the left and right, the side images on both sides without feeling discomfort. At this time, the ECU 16 may gradually enlarge the side image P3 in proportion to a time during which the direction of the line of sight of the driver is unchanged and output the side image P3 thus enlarged to the display unit 15.

Figure 11B:
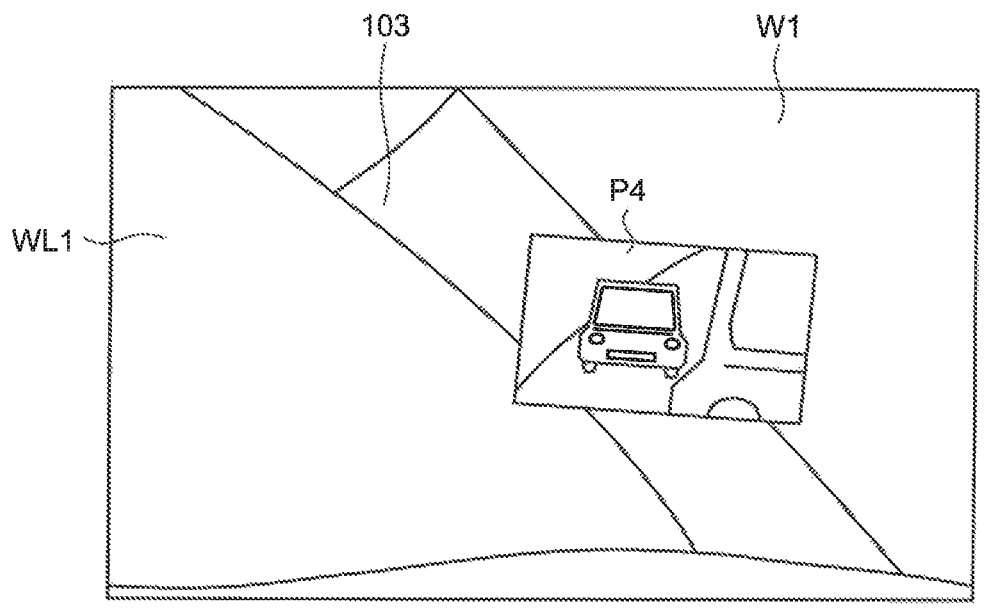
FIG. 11B is a schematic diagram for describing an example of the side image on the side view display.
Figure 12:
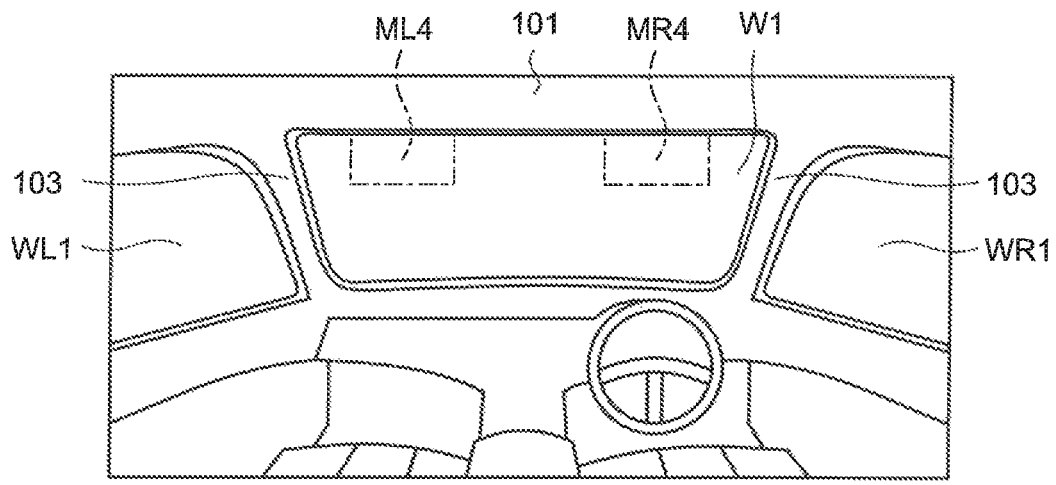
FIG. 12 is a schematic diagram for describing different display positions of the side view display.

Further, as illustrated in FIG. 11B or FIG. 12, when the line of sight of the driver is directed toward an upper left or right of the windshield W1 or toward an A pillar 103, the ECU 16 may output the side image P3 to the display unit 15 to cause the display unit 15 to project the side image P3 or a side image P4 onto positions ML4, MR4 on an upper side of the windshield W1 to provide the side view display. This allows the driver U1 to reduce the movement of the line of sight during driving. Further, in a case of a pillarless display, the side image P3 may be displayed closer to the windshield W1.

Figure 13:
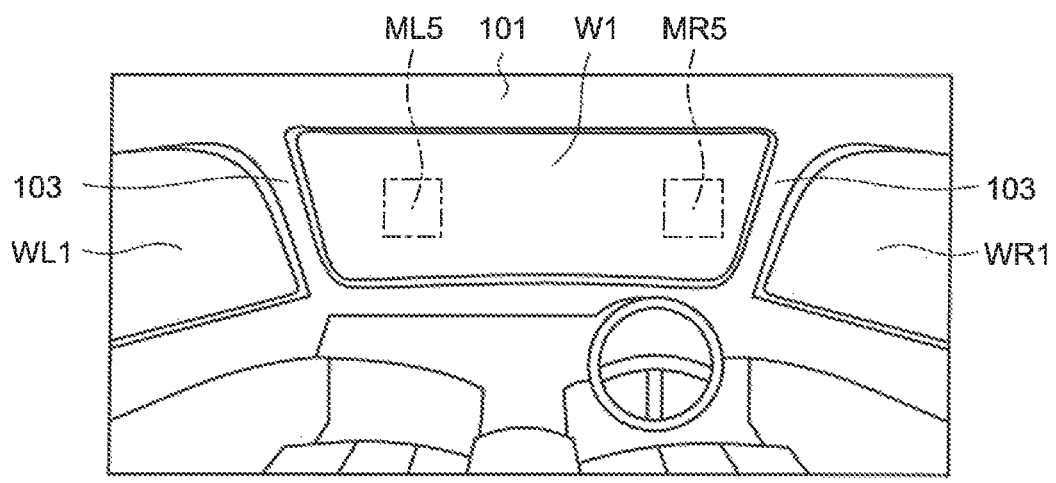
FIG. 13 is a schematic diagram for describing different display positions of the side view display.

Further, as illustrated in FIG. 13, when the line of sight of the driver is directed toward the side window WL1, WR1, or a position ML5, MR5 on the windshield W1 corresponding to an area where a conventional fender mirror is installed, the ECU 16 outputs the side image P3 to the display unit 15 to causes the display unit 15 to project the side image P3 onto the side window WL1, WR1, or the position ML5, MR5 on the windshield W1 to provide the side view display. This allows the driver U1 to reduce the movement of the line of sight during driving.

Further, the ECU 16 may change a display timing of the side image P3 to be displayed by the display unit 15 based on the vehicle speed information acquired from the vehicle speed sensor 11. For example, the ECU 16 may control the display unit 15 to make the display timing at which the display unit 15 displays the side image P3 earlier as the vehicle speed of the vehicle is higher.

In Step S109, when the ECU 16 determines that the line of sight of the driver is not directed toward a side (Step S109: No), the driver-assistance device 1 proceeds to Step S105.

According to the first embodiment described above, the ECU 16 sets the display position and the display contents of the image generated from the image data based on the line-of-sight information on the line of sight of the driver and outputs the display position and the display contents together with the image, allowing the image having contents in accordance with a position where the line of sight of the driver is directed to be displayed on the position and in turn allowing the driver to intuitively grasp the surrounding environment of the vehicle.

Further, according to the first embodiment, when the line of sight of the driver is directed obliquely toward the upper side of the boundary between the roof and the windshield of the vehicle, the ECU 16 generates the bird's-eye view image P1 being a virtual bird's-eye view image representing a bird's-eye view of the vehicle and to be displayed on the roof based on the image corresponding to the image data that results from imaging the surroundings of the vehicle and outputs the bird's-eye view image P1 to the display unit 15, allowing the driver to intuitively grasp the surrounding environment of the vehicle and a distance to an object located around the vehicle and in turn allowing the driver to easily avoid danger.

Further, according to the first embodiment, the ECU 16 offset the bird's-eye view image P1 to a position where the plane parallel to the reference plane determined in accordance with the positions of the wheels of the vehicle and passing through the predetermined reference position in the vehicle intersects with the direction of the line of sight of the driver and outputs the bird's-eye view image P1, allowing the driver to easily check the bird's-eye view image P1 without taking an unusual position and in turn allowing the driver to reduce a burden on his or her neck.

Further, according to the first embodiment, the ECU 16 rotates the bird's-eye view image P1 by the predetermined angle about the predetermined reference position in the vehicle and outputs the bird's-eye view image P1 to the display unit 15, allowing the driver to easily grasp the surrounding environment of the vehicle.

Further, according to the first embodiment, the ECU 16 performs the trimming processing to cut out at least areas of the bird's-eye view image P1 where the roof, the door, the A pillar, the B pillar or the C pillar, the D pillar, and the like of the vehicle appear and outputs the bird's-eye view image to the display unit 15, making it possible to prevent an occurrence of an occlusion state where an area located farther than an obstacle such as the roof is hidden by the obstacle and in turn prevent the driver from feeling discomfort in perspective of the bird's-eve view image P1.

Further, according to the first embodiment, when the line of sight of the driver is directed obliquely toward an upper side of the cabin of the vehicle and toward the center of the windshield in the cabin of the vehicle, the ECU 16 generates the rear image P2 to be displayed on the upper center of the windshield based on the image corresponding to the image data that results from imaging the surroundings of the vehicle and outputs the rear image P2 to the display unit 15, making it possible remove a rearview mirror from the vehicle or downsize the rearview mirror. This in turn makes it possible to make a visual field of the driver during driving wider and increase safety.

Further, according to the first embodiment, when the vehicle is stopped, the ECU 16 outputs, to the display unit 15, the enlarged image that results from enlarging the rear image P2 larger than the image displayed when the vehicle is traveling, allowing the driver to easily check for safety and in turn making it possible to prevent the driver from failing to check the rear of the vehicle.

Further, according to the first embodiment, when the line of sight of the driver is directed toward a side of the vehicle, the ECU 16 generates the side image P3 to he displayed on at least one of positions MR3, ML3 each corresponding to an area where a conventional sideview mirror is installed, the positions MR5, ML5 each corresponding to an area where a conventional fender mirror is installed, and the positions MR4, ML4 at upper left and might of the windshield W1 and outputs the side image P3 to the display unit 15, allowing the driver to check the rear of the side of the vehicle without feeling discomfort because each of the positions is the same as a position where a conventional inner mirror or outer mirror is installed. Further, although not illustrated, an image may be displayed on the A pillar 103.

Further, according to the first embodiment, when the line of sight of the driver is directed toward the side remote from the driver's seat, the ECU 16 outputs, to the display unit 15, the side image P3 at a display timing earlier than a display timing when the line of sight of the driver is directed toward the side adjacent to the driver's seat, allowing the driver to check the rear of the side of the vehicle without feeling discomfort even when the driver moves his or her line of sight to the side remote from the driver's seat.

Further, according to the first embodiment, when the line of sight of the driver is directed to the side remote from the driver's seat, the ECU 16 enlarges a display area of the side image P3 to make display area larger than a display area on the side adjacent to the driver seat and outputs the side image P3 to the display unit 15, allowing the driver to easily check the rear of the side of the vehicle even when the driver moves his or her line of sight to the side remote from the driver's seat.

Note that, according to the first embodiment, the ECU 16 laterally inverts or resize the bird's-eye view image P1, the rear image P2, and the side image P3 in a known manner and causes the display unit 15 to display the bird's-eye view image P1, the rear image P2, and the side image P3, but may cause the display unit 15 to display the bird's-eye view mage P1, the rear image P2, and the side image P3 without lateral inversion or resizing. It is needless to say that the ECU 16 may select whether to laterally invert or resize the bird's-eye view image P1, the rear image P2, and the side image P3 in accordance with an operation performed on an operation unit (not illustrated).

Figure 14:
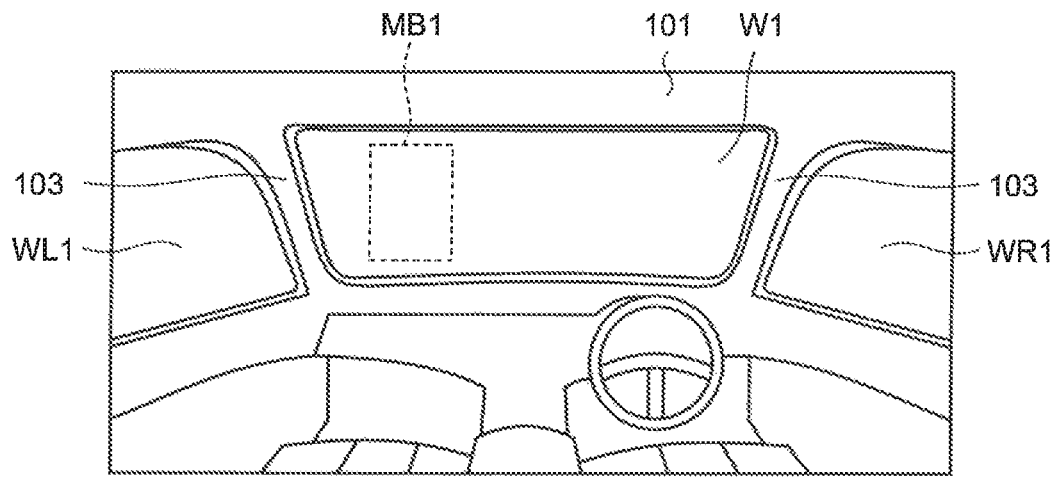
FIG. 14 is a diagram schematically illustrating an example of the top view display when viewed from above.
Figure 15:
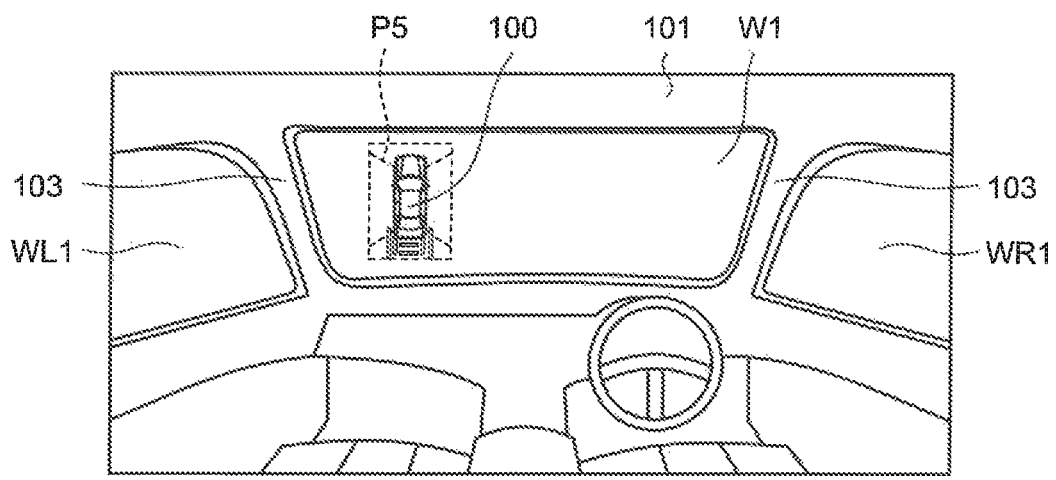
FIG. 15 is a schematic diagram illustrating an example of an image on the top view display.

Further, according to the first embodiment, when determining that the driver looks at an area near the windshield W1 (for example, the boundary between the roof 101 and the windshield W1) after determining that the line of sight of the driver is directed toward the upper side of the boundary between the roof 101 and the windshield W1 of the vehicle 100, the ECU 16 may generate the bird's-eye view image being a virtual bird's eye view image representing a bird's-eye view of the vehicle 100 and to be displayed on the roof 101 or the windshield W1 based on the image generated from the image data that results from imaging the surroundings of the vehicle 100 and output the bird's-eye view image. Specifically, as illustrated in FIG. 14 and FIG. 15, when determining that the driver looks at the area near the windshield W1 after determines that the line of sight of the driver is directed toward the upper side of the boundary between the roof 101 and the windshield W1 of the vehicle 100, the ECU 16 may generate the bird's-eye view image being a virtual bird's eye view image representing a bird's-eye view of the vehicle 100 and to be displayed on the roof 101 or the windshield W1 based on the image generated from the image data that results from imaging the surroundings of the vehicle 100 and output the bird's-eye view image. Specifically, as illustrated in FIG. 14 and FIG. 15, when determining that the driver looks at the area near the windshield W1 after determines that the line of sight of the driver is directed toward the upper side of the boundary between the roof 101 and the windshield W1 of the vehicle 100, the ECU 16 causes the display unit 15 to project a virtual bird's-eye view image P5 representing a bird's-eye view of the vehicle 100 onto the roof 101 or an area MB1 in the windshield W1. As a result, the bird's-eye view image P5 is displayed on the roof 101 or the windshield W1, allowing the driver to intuitively grasp the situation of the surrounding environment of the vehicle 100. Furthermore, the bird's-eye view image P5 is displayed on the roof 101 or the windshield W1, allowing the driver to easily grasp a distance to an object located around the vehicle 100 and thus easily avoid danger.

Next, a description will be given of a second embodiment. According to the first embodiment described above, the display unit 15 projects an image onto the interior of vehicle to display the image, whereas, according to the second embodiment, an image is displayed using a wearable device. In the following description, the same components as the components of the driver-assistance device 1 according to the first embodiment described above are denoted by the same reference numerals, and detailed descriptions of the components will not be given.

Figure 16:
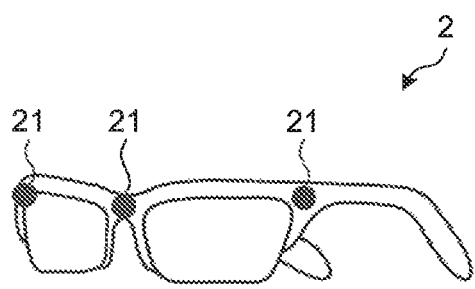
FIG. 16 is a diagram illustrating a schematic configuration of a wearable device according to a second embodiment.
Figure 17:
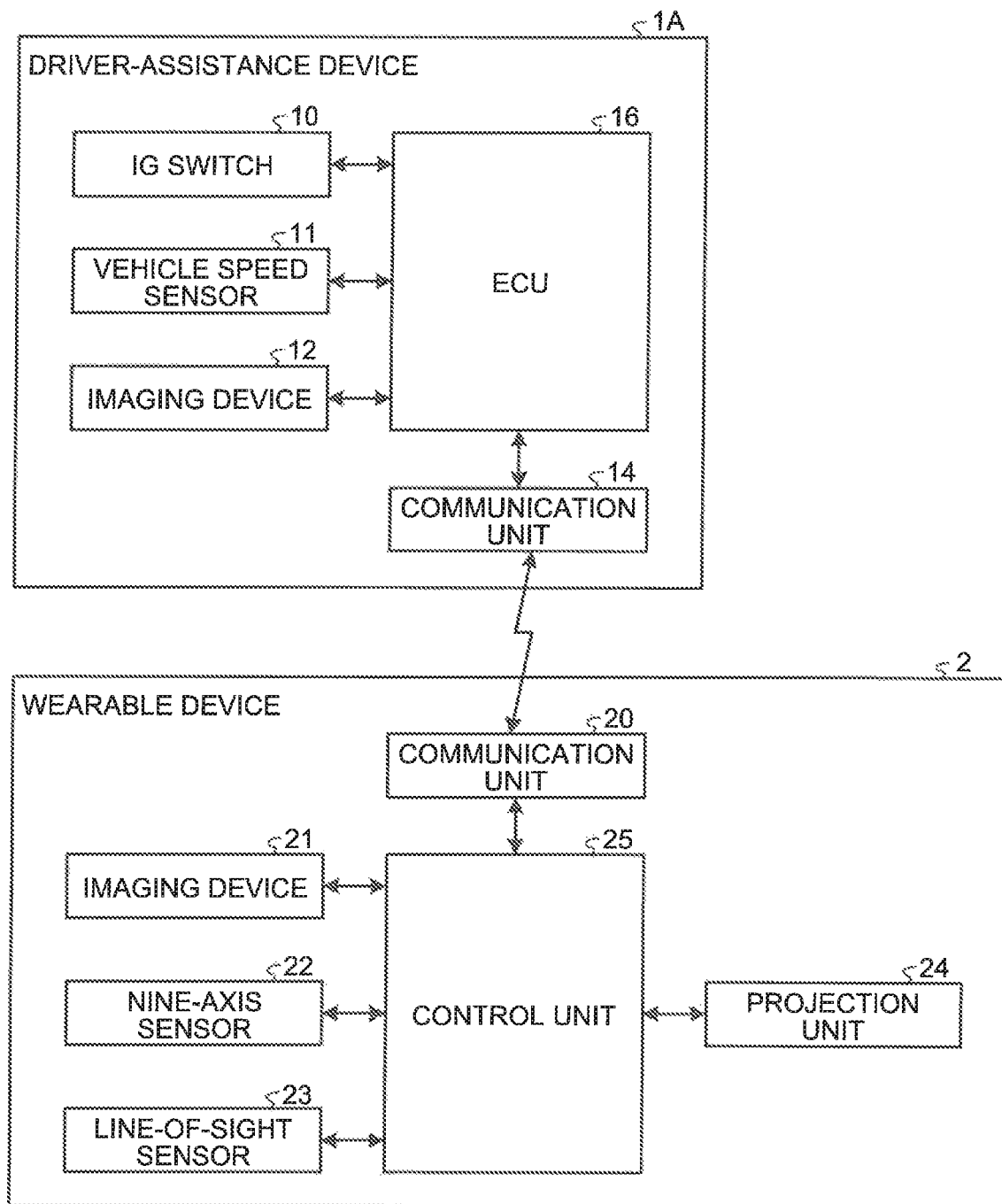
FIG. 17 is a block diagram illustrating a functional configuration of a driver-assistance system including a driver-assistance device and the wearable device according to the second embodiment.

FIG. 16 is a diagram illustrating a schematic configuration of a wearable device according to the second embodiment. FIG. 17 is a block diagram illustrating a functional configuration of a driver-assistance system including a driver-assistance device and the wearable device according to the second embodiment.

First, a description will be given of a configuration of a driver-assistance device 1A. The driver-assistance device 1A illustrated in FIG. 16 is identical in configuration to the driver-assistance device 1 according to the first embodiment described above except that the driver-assistance device 1A includes neither the line-of-sight sensor 13 nor the display unit 15.

Next, a description will be given of a configuration of a wearable device 2. The wearable device 2 illustrated in FIG. 16 and FIG. 17 is a glasses-type device that can be worn by the driver and is capable of providing augmented reality (AR). Furthermore, the wearable device 2 is a device that transmits light in a visual field of the driver and forms an image on a retina of the driver so as to allow the driver to view a virtual image in the visual field the driver. The wearable device 2 includes a communication unit 20, an imaging device 21, a nine-axis sensor 22, a projection unit 24, and a control unit 25.

The communication unit 20 transmits and receives various information to and from the driver-assistance device 1A or a server in accordance with a predetermined communication standard via a network under control of the control unit 25. The communication unit 20 includes a communication module capable of radio communication.

The imaging devices 21 are provided at a plurality of locations as illustrated in FIG. 16. Each of the imaging devices 21 images, for example, a cabin of the vehicle to generate image data and outputs the image data to the control unit 25 under the control of the control unit 25. The imaging device 21 includes an optical system including one or a plurality of lenses, and a CCD, a CMOS, or the like that receives light representing an object image that results from collecting light with the optical system to generate the image data.

The nine-axis sensor 22 includes a three-axis gyro sensor, a three-axis acceleration sensor, and a three-axis geomagnetic (compass) sensor. The nine-axis sensor 22 detects an angular velocity and acceleration applied to the wearable device 2 and outputs the detection result to the control unit 25. Further, the nine-axis sensor 22 detects an absolute azimuth angle by detecting a magnetic field and outputs the detection result to the control unit 25.

A line-of-sight sensor 23 detects a direction of the line of sight of the driver who is a wearer of the wearable device 2 and outputs the detection result to the control unit 25. The line-of-sight sensor 23 includes an optical system, a CCD or CMOS, a memory, and a processor including hardware such as a CPU or a GPU. The line-of-sight sensor 23 detects both a non-moving part of the eyes of the driver as a reference point (for example, an inner corner) using, for example, known template matching and a moving part of the eyes (for example, an iris) as a moving point to detect the direction of the line of sight of the driver based on a positional relation between the reference point and the moving point.

The projection unit 24 projects an image, a motion image, and character information onto a wearable device display unit (for example, a lens unit) or a retina of the driver under the control of the control unit 25. The projection unit 24 includes an RGB laser that emits each of RGB laser beams, a MEMS mirror that reflects a laser beam, a reflection mirror that projects the laser beam reflected off the MEMS mirror onto the retina of the driver, and the like.

The control unit 25 controls an operation of each unit of the wearable device 2. The control unit 25 includes a memory and a processor including hardware such as a CPU. The control unit 25 controls display contents and a display position of the mage to be projected by the projection unit 24 under the control of the ECU 16 of the driver-assistance device 1A. For example, the control unit 25 sets a display position and display contents of the image corresponding to the image data input from the ECU 16 and resulting from imaging the surroundings of the vehicle with the imaging device 12 of the driver-assistance device 1A and controls, based on information output together with the image, a reflection angle of the MEMS mirror of the projection unit 24 to control the display position of the image so as to make the image visible to the driver. Note that the control unit 25 detects marks provided on predetermined locations in the cabin of the vehicle such as the roof, the windshield, and the side window from the image corresponding to the image data input from the imaging device 21 to detect the line of sight of the driver. Furthermore, the control unit 25 may detect the line of sight of the driver based on the detection result of the nine-axis sensor 22.

Figure 18:
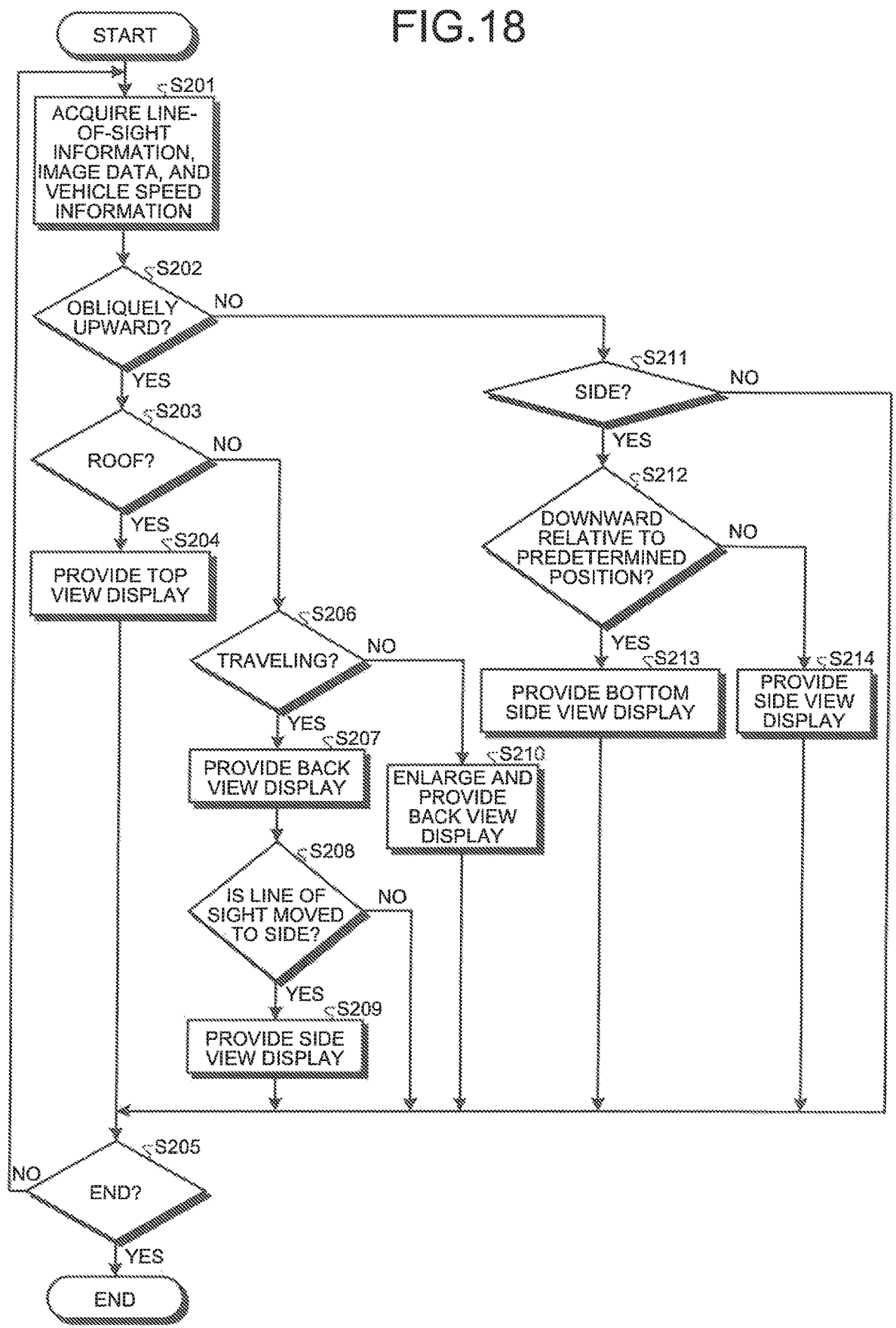
FIG. 18 is a flowchart illustrating an outline of processing to be executed by the driver-assistance device according to the second embodiment.

Next, a description will be given of processing to be performed by the driver-assistance device 1A. FIG. 18 is a flowchart illustrating an outline of processing to be executed by the driver-assistance device 1A.

As illustrated in FIG. 18, the ECU 16 first acquires the line-of-sigh information on the line of sight of the driver detected by the line-of-sight sensor 23 of the wearable device 2 via the communication unit 14, the image data from the imaging device 12, and the vehicle speed information detected by the vehicle speed sensor 11 (Step S201).

Subsequently, when the ECU 16 determines that the line of sight of the driver is directed obliquely toward the upper side of the boundary between the windshield and the roof of the vehicle (Step S202: Yes) and determines that the line of sight of the driver is directed toward the roof (Step S203: Yes), the driver-assistance device 1A proceeds to Step S204.

Subsequently, the ECU 16 generates a bird's-eye view image representing a bird's-eye view of the vehicle and to be displayed on the roof of the vehicle on a retina of the driver based on the image data input from the imaging device 12 of the vehicle and outputs the bird's-eye view image to the projection unit 24 to cause the projection unit 24 to project the bird's-eye view image to provide a top view display (Step S204). Specifically, as in the first embodiment described above, the ECU 16 rotates a real image by 180° about an axis passing through a center of the real image to be orthogonal to the real image, then, for example, laterally inverts the real image in the longitudinal direction of the vehicle and resizes the real image to adjust a distance between the vehicle and the driver to generate a virtual bird's-eye view image P1, and outputs the bird's-eye view image P1 to the projection unit 24. In this case, the projection unit 24 projects the bird's-eye view image P1 toward a position corresponding to the roof on the retina of the driver (see, for example, FIG. 3). Furthermore, the ECU 16 may output, to the projection unit 24, the bird's-eye view image P1 offset or inclined as in the first embodiment described above to cause the projection unit 24 to project the bird's-eye view image P1 onto a position offset from the position corresponding the roof on the retina of the driver (see FIG. 5). Further, the ECU 16 may perform the trimming processing to cut out areas of the bird's-eye view image where the roof, the door, the A pillar and the B pillar or the pillar, the D pillar, and the like of the vehicle appear and output the bird's-eye view image P100 subjected to the trimming processing to the projection unit 24 to cause the projection unit 24 to project the bird's-eye view image P100 onto the position corresponding to the roof on the retina of the driver (see FIG. 6A). After Step S204, the driver-assistance device 1A proceeds to Step S205.

Subsequently, the ECU 16 determines whether the IG switch 10 has been turned to OFF. When the ECU 16 determine that the IG switch 10 is OFF (Step S205: Yes), the driver-assistance device 1A brings the Present processing to an end. In contrast, when the ECU 16 determine that the IG switch 10 is not OFF (Step S205: No), the driver-assistance device 1A returns to Step S201 described above.

In Step S202, when the ECU 16 determines that the line of sight of the driver is directed obliquely toward the upper side of the vehicle (Step S202: Yes) and determines that the line of sight of the driver is not directed toward the roof (Step S203: No), the driver-assistance device 1A proceeds to Step S206.

Subsequently, the ECU 16 determines whether the vehicle is traveling based on the vehicle speed information acquired from the vehicle speed sensor 11 (Step S206), and determines that the vehicle is traveling (Step S206: Yes), the driver-assistance device 1A proceeds to Step S207.

Subsequently, the ECU 16 generates, based on the image data acquired from the imaging device 12, a rear image resulting from imaging a rear of the vehicle and to be projected onto a position on the retina of the driver corresponding to the upper center of the windshield and outputs the rear image to the projection unit 24 to cause the projection unit 24 to project the rear image to provide a back view display (see, for example, FIG. 8) (Step S207).

Thereafter, when the ECU 16 determines that the line of sight of the driver has moved to a side (Step S208: Yes), the driver-assistance device 1A proceeds to Step S209, and when the ECU 16 determines that the line of sight of the driver has not moved to a side (Step S208: No), the driver-assistance device 1A proceeds to Step S205.

In Step S209, the ECU 16 generates, based on the image data input from the imaging device 12, a side image resulting from imaging a rear of the side of the vehicle and to be projected onto a position on the retina of the driver corresponding to a side window of the vehicle and outputs the side image to the projection unit 24 to cause the projection unit 24 to project the side image to provide a side view display (see, for example, FIG. 11A). After Step S209, the driver-assistance device 1A proceeds to Step S205.

In Step S206, when the ECU 16 determines that the vehicle is not traveling (Step S206: No), the driver-assistance device 1A proceeds to Step S210.

Subsequently, the ECU 16 outputs, to the projection unit 24, a rear image resulting from imaging the rear of the vehicle and enlarged to a size corresponding to an area of the windshield on the retina of the driver based on the image data input from the imaging device 12 to cause the projection unit 24 to project the rear image thus enlarged to provide a back view display (see, for example, FIG. 9) (Step S210). This causes the driver to feel as if the driver were looking directly at the rear of the vehicle with his or her eyes through the wearable device 2, making it possible to increase safety. After Step S210, the driver-assistance device 1A proceeds to Step S205.

In Step S202, when the ECU 16 determines that the line of sight of the driver is not directed obliquely toward the upper side of the vehicle (Step S202: No), determines that the line of sight of the driver is directed) a side (Step S211: Yes), and determines that the line of sight of the driver is directed downward relative to a predetermined position (Step S212: Yes), the driver-assistance device 1A proceeds to Step S213. Herein, the predetermined position is a position located below 0° that is a direction of the line of sight of the driver when the driver looks in a direction parallel to the reference plane while being seated on driver's seat.

Subsequently, the ECU 16 generates, based on the image data acquired from the imaging device 12, a virtual bottom image resulting on imaging a portion immediately below the A pillar of the vehicle and to be displayed onto a position on the retina of the driver corresponding to an area where a conventional side window of the vehicle is installed and outputs the bottom image to the projection unit 24 to cause the projection unit 24 to project the bottom it age to provide a bottom side view display (Step S213). This allows the driver to intuitively grasp an area hidden by the A-pillar only by moving the line of sight downward. After Step S213, the driver-assistance device 1A proceeds to Step S205.

In Step S212, when the ECU 16 determines that the line of sight of the driver is not directed downward relative to the predetermined position (Step S212: No), the driver-assistance device 1A proceeds to Step S214.

Subsequently, the ECU 16 outputs, to the projection unit 24, a side image resulting from imaging a rear of the side of the vehicle and to be displayed onto a position on the retina of the driver corresponding to an area where a conventional side window of the vehicle is installed. on the image data acquired from the imaging device 12 to cause the projection unit 24 to project the side image to provide a side view display (see, for example, FIG. 11A) (Step S214). After Step S214, the driver-assistance device 1A proceeds to Step S205.

In Step S211, when the ECU 16 determines that the line of sight of the driver is not directed toward a side (Step S211: No), the driver-assistance device 1A proceeds to Step S205.

According to the second embodiment described above, the ECU 16 sets the display position and the display contents of the image to be displayed on the wearable device 2 based on the line-of-sight information on the line of sight of the driver and outputs the display position and the display contents together with the image to the wearable device 2, allowing the driver to intuitively grasp.

Further, according to the second embodiment, the ECU 16 may control the display position, the display area, and the display angle of the image to be projected by the projection unit 24 in accordance with a gesture of the driver. In this case, the ECU 16 detects a gesture of the driver appearing in the image corresponding to the image data generated by the imaging device 21 of the wearable device 2, such as a pinch action to require enlargement or reduction of the image, or a flick action or swipe action to require movement of the image, and controls the display position, the display area, and the display angle of the image to be projected by the projection unit 24 in accordance with the detection result.

Figure 19:
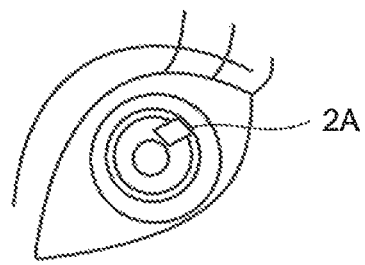
FIG. 19 is a diagram illustrating a schematic configuration of another wearable device according to the second embodiment.
Figure 20:
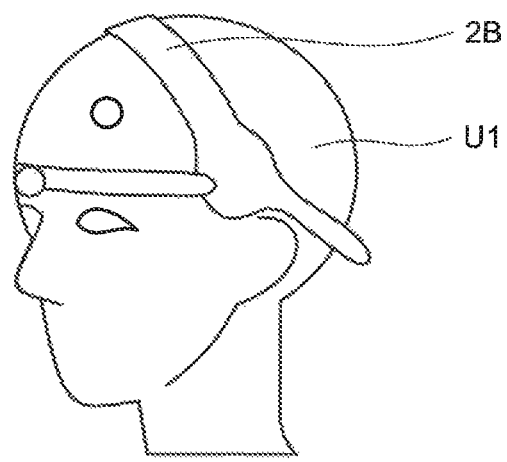
FIG. 20 is a diagram illustrating a schematic configuration of yet another wearable device according to the second embodiment.
Figure 21:
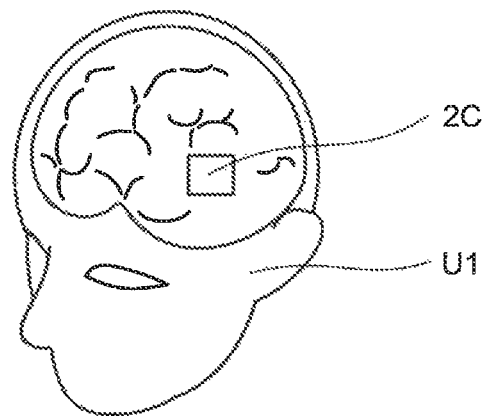
FIG. 21 is a diagram illustrating a schematic configuration of yet another wearable device according to the second embodiment.
Figure 22:
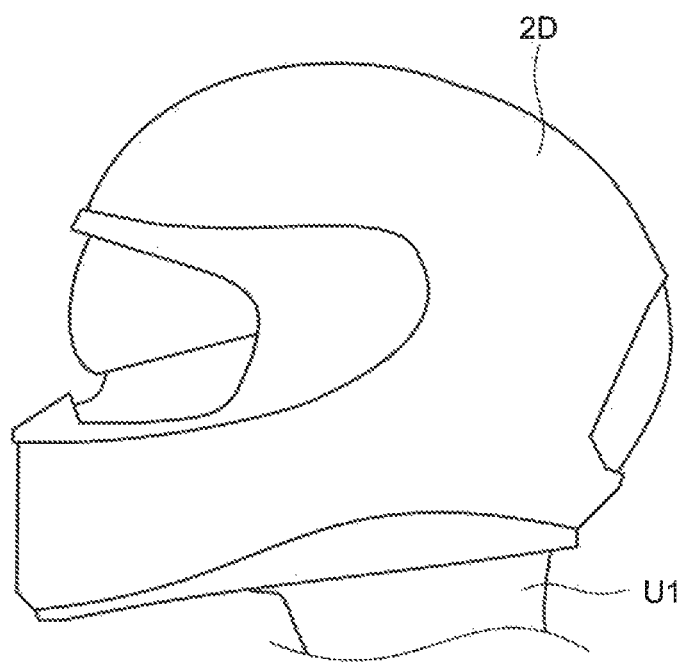
FIG. 22 is a diagram illustrating a schematic configuration of yet another wearable device according to the second embodiment.

Note that, in the second embodiment, the description has been given of the example using the glasses-type wearable device 2 that can be worn by the driver, but the present disclosure is not limited to the second embodiment and is applicable to various wearable devices. For example, as illustrated in FIG. 19, the present disclosure is also applicable to a contact-lens-type wearable device 2A capable of taking an image. Furthermore, the present disclosure is also applicable to even a device such as a wearable device 2B illustrated in FIG. 20 or a brain-chip-type wearable device 20 illustrated in FIG. 21 that directly communicates with a brain of the driver U1. Furthermore, like a wearable device 2D of FIG. 22, a helmet-shaped device having a visor may be used, for example. This configuration eliminates the need for wearing the above-described wearable device 2 together with a helmet.

Further, according to the second embodiment, the wearable device 2 projects the image onto the retina of the driver to cause the driver to view the image, or alternatively, the wearable device 2 may be configured to project the image onto a lens of, for example, glasses.

Further, according to the second embodiment, the ECU 16 controls the display contents and the display position of the image to be displayed by the projection unit 24 of the wearable device 2 based on the image data generated by the imaging device 12, or alternatively, the control unit 25 of the wearable device 2 may acquire the image data from the imaging device 12 via the communication unit 20, set the display position and the display contents of the image generated based on the image data thus acquired, and outputs the display position and the display contents together with the image to the projection unit 24.

Next, a description will be given of a third embodiment. According to the first and second embodiments described above, the ECU 16 sets the display position and the display contents of the image based on the image data acquired from the imaging device 12 mounted on the owner's vehicle and outputs the display position and the display contents together with the image. In contrast, according to the third embodiment, a server sets the display position and the display contents of an image based on image data acquired from another vehicle or a GPS satellite and. outputs the display position and the display contents together with the image. Note that the same components as the components of the driver-assistance device 1 according to the first embodiment described above are denoted by the same reference numerals, and detailed descriptions of the components will not be given.

Figure 23:
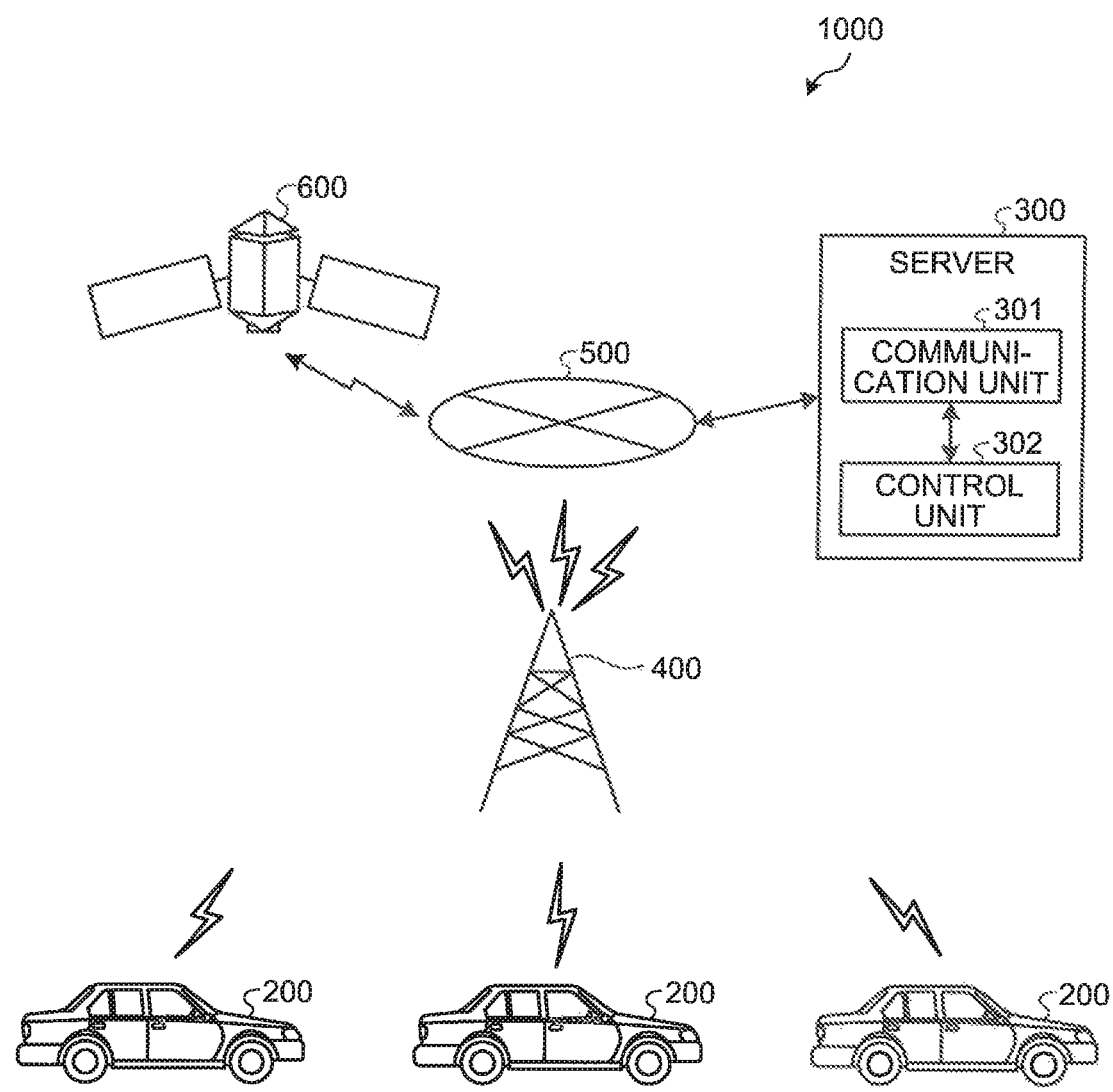
FIG. 23 is a schematic diagram illustrating an outline of a driver-assistance system according to a third embodiment.

FIG. 23 is a schematic diagram illustrating schematic configuration of a driver-assistance system according to the third embodiment. A driver-assistance system 1000 it in FIG. 23 includes a plurality of vehicles 200 and a server 300. The plurality of vehicles 200 and the server 300 are capable of communicating information with each other via a base station 400 and a network 500. Further, the plurality of vehicles 200 receive signals from a plurality of GPS satellites 600 and calculate respective positions based on the signals thus received. Further, the server 300 causes the GPS satellites 600 to image the vehicles 200 from above and captures image data via the base station 400 and the network 500.

First, a description will be given of a configuration of each of the vehicles 200. The vehicles 200 illustrated in FIG. 23 are each equipped with the driver-assistance device 1 according to the first embodiment described above, and the driver-assistance device 1 has the same capability except that the ECU 16 is not capable of setting a display position and display contents of an image based on image data acquired from the imaging device 12 and outputting the display position and the display contents together with the image.

Next, a description will be given of a configuration of the server 300. The server 300 illustrated in FIG. 23 includes a communication unit 301 and a control unit 302.

The communication unit 301 transmits and receives various information in accordance with a predetermined communication standard via the network 500 and the base station 400 under control of the control unit 302. Further, the communication unit 301 transmits various information to each of the vehicles 200 in accordance with a predetermined communication standard and receives various information from each of the GPS satellites 600 or each of the vehicles 200 under control of a control unit 302. The communication unit 301 includes a communication module capable of radio communication.

The control unit 302 includes a memory and a processor including hardware such as a CPU. The control unit 302 acquires line-of-sight information on a line of sight of a driver from a vehicle 200 that has requested an image (hereinafter, simply referred to as a "request vehicle 200") and image data from a vehicle 200 located near the request vehicle 200 (hereinafter, referred to as an "other vehicle 200") or a CPS satellite 600 via the communication unit 301. Then, the control unit 302 generates, based on the line-of-sight information acquired from the request vehicle 200, an image representing virtually-realized surrounding situation of the request vehicle 200 from the image data acquired from the other vehicle 200 or the GPS satellite 600, sets the display position and the display contents of the image thus generated, and outputs the display position and the display contents together with the image to the request vehicle 200 to cause the display unit 15 of the request vehicle 200 to display the image. Note that the control unit 302 may generate, based on the line-of-sight information acquired from the request vehicle 200, an image representing virtually-realized surrounding situation of the request vehicle 200 from a plurality of pieces of image data stored in the memory, set the display position and the display contents of the image thus generated, and output the display position and the display contents together with the image to the request vehicle 200 to cause the display unit 15 of the request vehicle 200 to display the image. Further, according to the third embodiment, the control unit 302 functions as a processor.

According to the third embodiment described above, the control unit 302 generates the image representing virtually-realized surrounding situation of the request vehicle 200, sets the display position and the display contents of the image thus generated, and outputs the display position and the display contents together with the image to the request vehicle 200, allowing the image having contents in accordance with a position toward which the line of sight of the driver in the request vehicle 200 is directed to be displayed on the position in the request vehicle 200 and in turn allowing the driver of the request vehicle 200 to intuitively grasp the surrounding environment of the vehicle.

Further, in the driver-assistance devices according to the first to third embodiments, the "unit" described above can be read as a "circuit" or the like. For example, the control unit can be read as a control circuit.

Further, in the driver-assistance device according to the first to third embodiments, the ECU acquires the line-of-sight information on the line of sight of the driver and the image data that results from imaging surroundings of the vehicle, sets the display position and the display contents of the image generated from the image data based on the line-of-sight information, and outputs the display position and the display contents together with the image, but the present disclosure is not limited to such a configuration, and a device including a device other than an ECU or a graphics processing unit (GPU) and more suitable than an ECU or a CPU such as a field programmable gate array (FPGA) or a digital signal processing (DSP), a memory, and the like may perform the above processing.

Further, a program to be executed by the driver-assistance device according to the first to third embodiments is installable or executable file data, and the program is recorded in a computer-readable recording medium such as a CD-ROM, a flexible disk (FD), a CD-R, a digital versatile disk (DVD), a USE medium, or a flash memory and then distributed.

Further, the program to be executed by the driver-assistance device according to the first to third embodiments may be stored on a computer connected to a network such as the Internet and distributed through downloading via the network.

Note that, in the description of the flowcharts herein, the words such as "first", "thereafter", and "subsequently" are used to explicitly show the sequential relation among steps, but the order of processes required to implement the present embodiment is not uniquely determined by such words. That is, the order of processes in the flowcharts illustrated herein may be changed on condition that no contradiction occurs.

According to the present disclosure, the processor sets a display position and display contents of an image generated from the image data that results from imaging the surroundings of the vehicle based on the line-of-sight information on the line of sight of the driver and outputs the display position and the display contents together with the image, making it possible to present the driver with an image having contents in accordance with a position toward which the line of sight of the driver is directed, which in turn allows the driver to intuitively grasp the surrounding environment of the vehicle.

Some embodiments of the present disclosure allow the driver to intuitively grasp the surrounding environment of the vehicle, increases visibility, and in turn allows the driver to easily avoid danger.

Some embodiments of the present disclosure allow the driver to easily check the bird's-eye view image without taking an unusual position and in turn allows the driver to reduce a burden on his or her neck.

Some embodiments of the present disclosure allow the driver to easily grasp the surrounding environment of the vehicle.

Some embodiments of the present disclosure make it possible to prevent an occurrence of an occlusion state where an area located farther than an obstacle such as a roof is hidden by the obstacle and in turn prevents the driver from feeling discomfort in perspective of the bird's-eye view image.

Some embodiments of the present disclosure make it possible to remove a rearview mirror from the vehicle or downsize the rearview mirror and in turn makes it possible to make a visual field of the driver wider and increase safety.

Some embodiments of the present disclosure allow the driver to easily check for safety and in turn makes it possible to prevent the driver from failing to check the rear of the vehicle.

Some embodiments of the present disclosure allow the driver to check a rear of the side of the vehicle without feeling discomfort because the position is the same as the position where a conventional outer mirror is installed.

Some embodiments of the present disclosure allow the driver to check, even when the driver moves his or her line of sight toward a side remote from the driver, a rear of the side of the vehicle without feeling discomfort.

Some embodiments of the present disclosure allow the driver to easily check, even when the driver moves his or her line of sight toward the side remote from the driver's seat, the rear of the side of the vehicle.

Some embodiments of the present disclosure display an image having contents in accordance with the direction of the line of sight and allows the driver to intuitively grasp.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A driver-assistance device comprising:
   a memory; and
   a processor comprising hardware, the processor being configured to:
      acquire both line-of-sight information on a line of sight of a driver and image data resulting from imaging surroundings of a vehicle;
      set a display position and display contents of an image generated from the image data based on the line-of-sight information;
      output the display position and the display contents together with the image;
      determine whether the line of sight of the driver is directed upward from parallel, or whether the line of sight of the driver is directed toward an upper side of a boundary between a roof and a windshield of the vehicle based on the line-of-sight information;
      generate a bird's-eye view image based on the image when determining that the line of sight of the driver is directed toward the upper side, the bird's-eye view image being a virtual bird's-eye view image representing a bird's-eye view of the vehicle and to be displayed on the roof; and output the generated bird's-eye view image.

2. The driver-assistance device according to claim 1, wherein the processor is configured to:

offset the bird's-eye view image to a position where a plane parallel to a reference plane determined based on information containing wheels of the vehicle intersects with a direction of the line of sight, the plane passing through a predetermined reference position in the vehicle; and output the offset bird's-eye view image.

3. The driver-assistance device according to claim 2, wherein the processor is configured to:

rotate the bird's-eye view image by a predetermined angle about the reference position containing the bird's-eye view image; and output the rotated bird's-eye view image.

4. The driver-assistance device according to claim 3, wherein the processor is configured to perform trimming processing to cut out at least an area of the bird's-eye view image where an interior part appears when viewed from a cabin of the vehicle and outputs the bird's-eye view image.

5. The driver-assistance device according to claim 1, wherein the processor is configured to:

generate a bird's-eye view image based on the image when determining that the driver looks at an area near the windshield after determining that the line of sight of the driver is directed toward the upper side, the bird's-eye view image being a virtual bird's-eye view image representing a bird's-eye view of the vehicle and to be displayed on the roof or the windshield; and output the generated bird's-eye view image,.

6. A driver-assistance system comprising:

a driver-assistance device according to claim 1; and a wearable device configured to:

bidirectionally communicate with the driver-assistance device; and virtually display the image in a visual field area while transmitting light in the visual field area, wherein the wearable device includes a line-of-sight sensor configured to detect the line-of-sight information, and wherein the processor is configured to:

set the display position and the display contents of the image for the wearable device based on the line-of-sight information; and output the display position and the display contents together with the image to the wearable device.

7. A driver-assistance system comprising:

a driver-assistance device according to claim 1; and a wearable device configured to:

bidirectionally communicate with the driver-assistance device;

virtually display the image in a visual field area while transmitting light in the visual field area; and a line-of-sight sensor provided in the vehicle, and configured to detect the line-of-sight information, and wherein the processor is configured to:

set the display position and the display contents of the image for the wearable device based on the line-of-sight information; and output the display position and the display contents together with the image to the wearable device.

8. A driver-assistance device comprising:

a memory; and a processor comprising hardware, the processor being configured to:

acquire both line-of-sight information on a line of sight of a driver and image data resulting from imaging surroundings of a vehicle;

set a display position and display contents of an image generated from the image data based on the line-of-sight information;

output the display position and the display contents together with the image;

determine whether the line of sight of the driver is directed toward an upper center of a windshield in the vehicle based on the line-of-sight information; and generate a rear image based on the image, the rear image resulting from imaging a rear of the vehicle from behind and to be displayed on the upper center of the windshield and outputs the rear image, when determining that the line of sight of the driver is directed toward the upper center of the windshield in the vehicle.

9. The driver-assistance device according to claim 8, wherein the processor is configured to:

acquire vehicle speed information on a vehicle speed of the vehicle, determines whether the vehicle is stopped based on the vehicle speed information;

enlarge the rear image to a size corresponding to an area of the windshield when determining that the vehicle is stopped; and output the enlarged rear image.

10. A driver-assistance system comprising:

a driver-assistance device according to claim 8; and a wearable device configured to:

bidirectionally communicate with the driver-assistance device; and virtually display the image in a visual field area while transmitting light in the visual field area, wherein the wearable device includes a line-of-sight sensor configured to detect the line-of-sight information, and wherein the processor is configured to:

set the display position and the display contents of the image for the wearable device based on the line-of-sight information; and output the display position and the display contents together with the image to the wearable device.

11. A driver-assistance system comprising:

a driver-assistance device according to claim 8; and a wearable device configured to:

bidirectionally communicate with the driver-assistance device;

virtually display the image in a visual field area while transmitting light in the visual field area; and a line-of-sight sensor provided in the vehicle, and configured to detect the line-of-sight information, and wherein the processor is configured to:

set the display position and the display contents of the image for the wearable device based on the line-of-sight information; and output the display position and the display contents together with the image to the wearable device.

12. A driver-assistance device comprising:
a memory; and
a processor comprising hardware, the processor being configured to:
  acquire both line-of-sight information on a line of sight of a driver and image data resulting from imaging surroundings of a vehicle;
  set a display position and display contents of an image generated from the image data based on the line-of-sight information;
  output the display position and the display contents together with the image;
  determine whether the line of sight of the driver is directed toward a side of the vehicle based on the line-of-sight information;
  generate a side image based on the image when determining that the line of sight of the driver is directed toward the side of the vehicle, the side image resulting from imaging a rear of the vehicle from the side and to be displayed on at least one of a position corresponding to a sideview mirror, a position corresponding to a fender mirror, and upper left and right positions on a windshield; and
  output the generated side image.

13. The driver-assistance device according to claim 12, wherein the processor is configured to make a display timing of the side image earlier than a display timing when the line of sight of the driver is directed toward the side adjacent to a driver's seat when the line of sight of the driver is directed toward the side remote from the driver's seat.

14. The driver-assistance device according to claim 13, wherein the processor is configured to:
  generate an enlarged image resulting from enlarging the side image compared with the side image displayed when the line of sight of the driver is directed toward the side adjacent to the driver's seat when the line of sight of the driver is directed toward the side remote from the driver's seat; and
  output the generated enlarged image.

15. A driver-assistance system comprising:
a driver-assistance device according to claim 12; and
a wearable device configured to:
  bidirectionally communicate with the driver-assistance device; and
  virtually display the image in a visual field area while transmitting light in the visual field area,
wherein the wearable device includes a line-of-sight sensor configured to detect the line-of-sight information, and
wherein the processor is configured to:
  set the display position and the display contents of the image for the wearable device based on the line-of-sight information; and
  output the display position and the display contents together with the image to the wearable device.

16. A driver-assistance system comprising:
a driver-assistance device according to claim 12; and
a wearable device configured to:
  bidirectionally communicate with the driver-assistance device;
  virtually display the image in a visual field area while transmitting light in the visual field area; and
a line-of-sight sensor provided in the vehicle, and configured to detect the line-of-sight information, and
wherein the processor is configured to:
  set the display position and the display contents of the image for the wearable device based on the line-of-sight information; and
  output the display position and the display contents together with the image to the wearable device.

* * * * *